United States Patent
Bao et al.

(10) Patent No.: US 11,573,286 B1
(45) Date of Patent: Feb. 7, 2023

(54) POSITIONING REFERENCE SIGNAL MEASUREMENT REQUEST FOR CARRIER PHASE-BASED POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/411,452

(22) Filed: Aug. 25, 2021

(51) Int. Cl.
*G01S 5/10* (2006.01)
*H04L 5/00* (2006.01)
*H04W 64/00* (2009.01)
*H04W 4/029* (2018.01)

(52) U.S. Cl.
CPC .............. *G01S 5/10* (2013.01); *H04L 5/0048* (2013.01); *H04W 64/003* (2013.01); *H04W 4/029* (2018.02)

(58) Field of Classification Search
CPC ...... G01S 5/10; H04L 5/0048; H04W 64/003; H04W 4/029
See application file for complete search history.

(56) References Cited

U.S. PATENT DOCUMENTS 5,596,330 A 1/1997 Yokev et al.
11,108,596 B2 * 8/2021 Hadaschik .......... H04L 25/0204

OTHER PUBLICATIONS

International Search Report and Written Opinion—PCT/US2022/073423—ISA/EPO—dated Oct. 25, 2022.

* cited by examiner

*Primary Examiner* — Kabir A Timory
(74) *Attorney, Agent, or Firm* — Thien T. Nguyen

(57) ABSTRACT

Disclosed are various techniques for wireless communication, and in particular, carrier-phase based positioning. In an aspect, a position estimation entity may obtain a first differential measurement based on measurement of a first set of positioning reference signal (PRS) resources by a first node and measurement of a second set of PRS resources by a second node, wherein the first set of PRS resources are phase-coherent with the second set of PRS resources. The position estimation entity may obtain a second differential measurement based on measurement of a third set of PRS resources by the first node and measurement of a fourth set of PRS resources by the second node, wherein the third set of PRS resources are phase-coherent with the fourth set of PRS resources. The position estimation entity may determine a positioning estimate of a target node based on the first differential measurement and the second differential measurement.

30 Claims, 20 Drawing Sheets

POSITIONING REFERENCE SIGNAL MEASUREMENT REQUEST FOR CARRIER PHASE-BASED POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes obtaining a first differential measurement based on measurement of a first set of positioning reference signal (PRS) resources by a first node and measurement of a second set of PRS resources by a second node, wherein the first set of PRS resources are phase-coherent with the second set of PRS resources; obtaining a second differential measurement based on measurement of a third set of PRS resources by the first node and measurement of a fourth set of PRS resources by the second node, wherein the third set of PRS resources are phase-coherent with the fourth set of PRS resources; and determining a positioning estimate of a target node based at least in part on the first differential measurement and the second differential measurement.

In an aspect, a position estimation entity includes a memory; at least one transceiver; and at least one processor communicatively coupled to the memory and the at least one transceiver, the at least one processor configured to: obtain a first differential measurement based on measurement of a first set of PRS resources by a first node and measurement of a second set of PRS resources by a second node, wherein the first set of PRS resources are phase-coherent with the second set of PRS resources; obtain a second differential measurement based on measurement of a third set of PRS resources by the first node and measurement of a fourth set of PRS resources by the second node, wherein the third set of PRS resources are phase-coherent with the fourth set of PRS resources; and determine a positioning estimate of a target node based at least in part on the first differential measurement and the second differential measurement.

In an aspect, a position estimation entity includes means for obtaining a first differential measurement based on measurement of a first set of PRS resources by a first node and measurement of a second set of PRS resources by a second node, wherein the first set of PRS resources are phase-coherent with the second set of PRS resources; means for obtaining a second differential measurement based on measurement of a third set of PRS resources by the first node and measurement of a fourth set of PRS resources by the second node, wherein the third set of PRS resources are phase-coherent with the fourth set of PRS resources; and means for determining a positioning estimate of a target node based at least in part on the first differential measurement and the second differential measurement.

In an aspect, a non-transitory computer-readable medium storing computer-executable instructions that, when executed by a position estimation entity, cause the position estimation entity to: obtain a first differential measurement based on measurement of a first set of PRS resources by a first node and measurement of a second set of PRS resources by a second node, wherein the first set of PRS resources are phase-coherent with the second set of PRS resources; obtain a second differential measurement based on measurement of a third set of PRS resources by the first node and measurement of a fourth set of PRS resources by the second node, wherein the third set of PRS resources are phase-coherent with the fourth set of PRS resources; and determine a positioning estimate of a target node based at least in part on the first differential measurement and the second differential measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
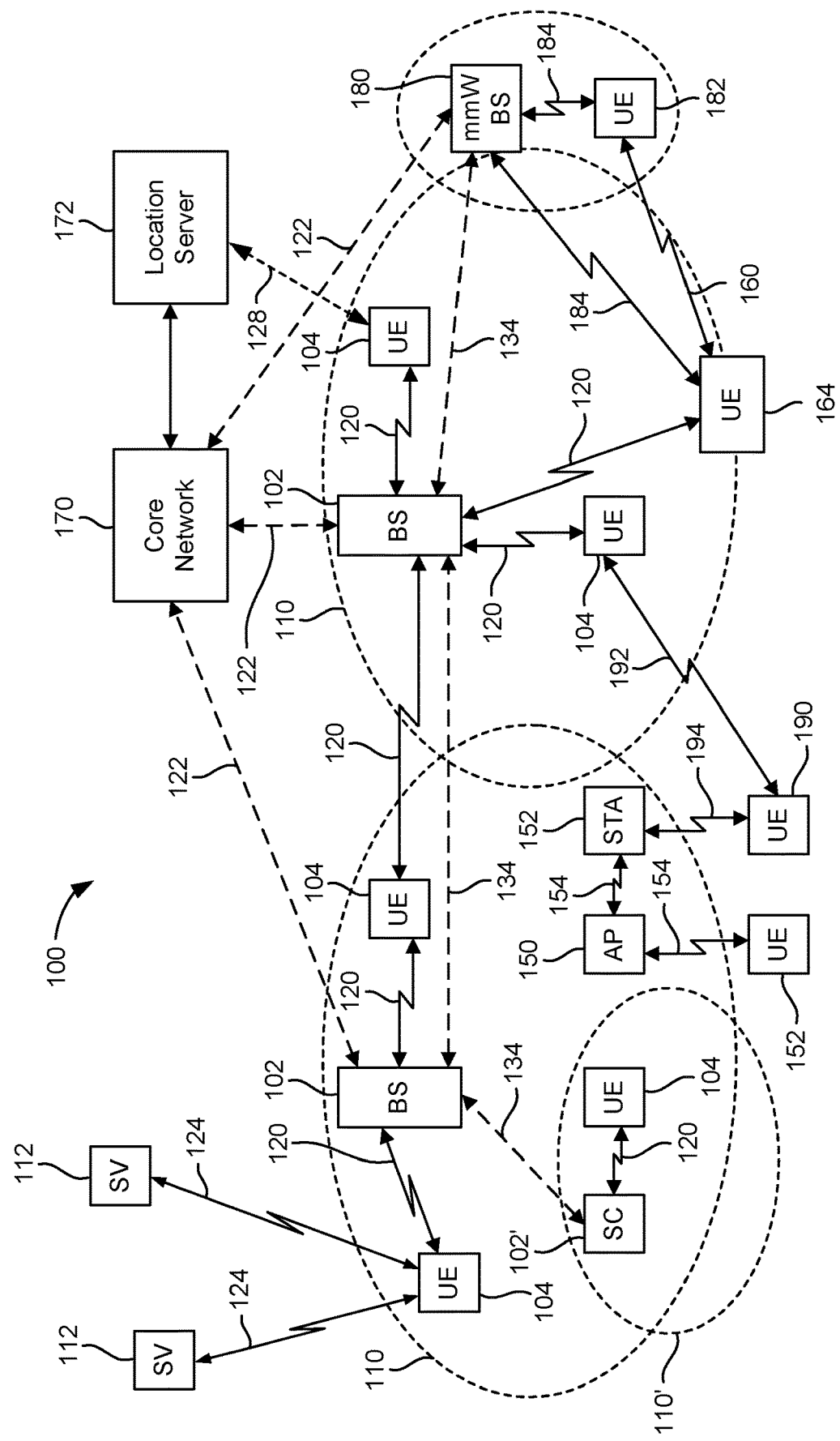
FIG. 1 illustrates an exemplary wireless communications system according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Global navigation satellite system (GNSS) precise point positioning (PPP) is a technique which takes advantage of the frequency-dependent nature of ionospheric delay. The ionosphere is dispersive, meaning that signals of different frequencies are slow by different amounts. PPP uses measurements at two different frequencies—e.g., L1 and L5—to determine the delay caused by the ionosphere. By measuring the difference in the delays between signals of different frequencies, the receiver can model and remove the ionospheric delay. PPP use cases include autonomous driving, which requires centimeter (cm) to decimeter (dm) positioning accuracy and a 95% circular error probable (CEP) less than one meter, as well as some Internet of Things (IoT) and industrial applications.

Real time kinematics (RTK) is a technique that provides relative positioning information with respect to a reference station. In traditional RTK, due to very high spatial correlation between reference station and client device, the atmospheric delays including ionospheric delay are virtually fully canceled out after applying the RTK correction. Ultra-long baseline RTK also requires dual frequency measurements to calculate and correct for ionospheric delay. Thus, consumer grade receivers generally must be capable of quality carrier phase measurements as well as multi-constellation, multi-frequency (MCMF) operation.

However, not all GPS satellites support L1 and L5, which means that handsets that require multiple frequencies for estimation of ionospheric delay can't provide precise positioning via PPP or ultra-long baseline RTK.

A new global navigation satellite system (GNSS) precise point positioning (PPP) model and systems for using same are presented herein. The new PPP model does not require dual frequency measurements to estimate the ionospheric delay and is thus applicable in situations where signals in the L1 or L5 frequency are not available. Moreover, in situations where L1 and L5 are both available, the new PPP model provides better performance over conventional methods.

The words "exemplary" and "example" are used herein to mean "serving as an example, instance, or illustration." Any aspect described herein as "exemplary", or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or fewer carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', WLAN AP 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites, global navigation satellite system (GNSS) vehicles, etc.). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
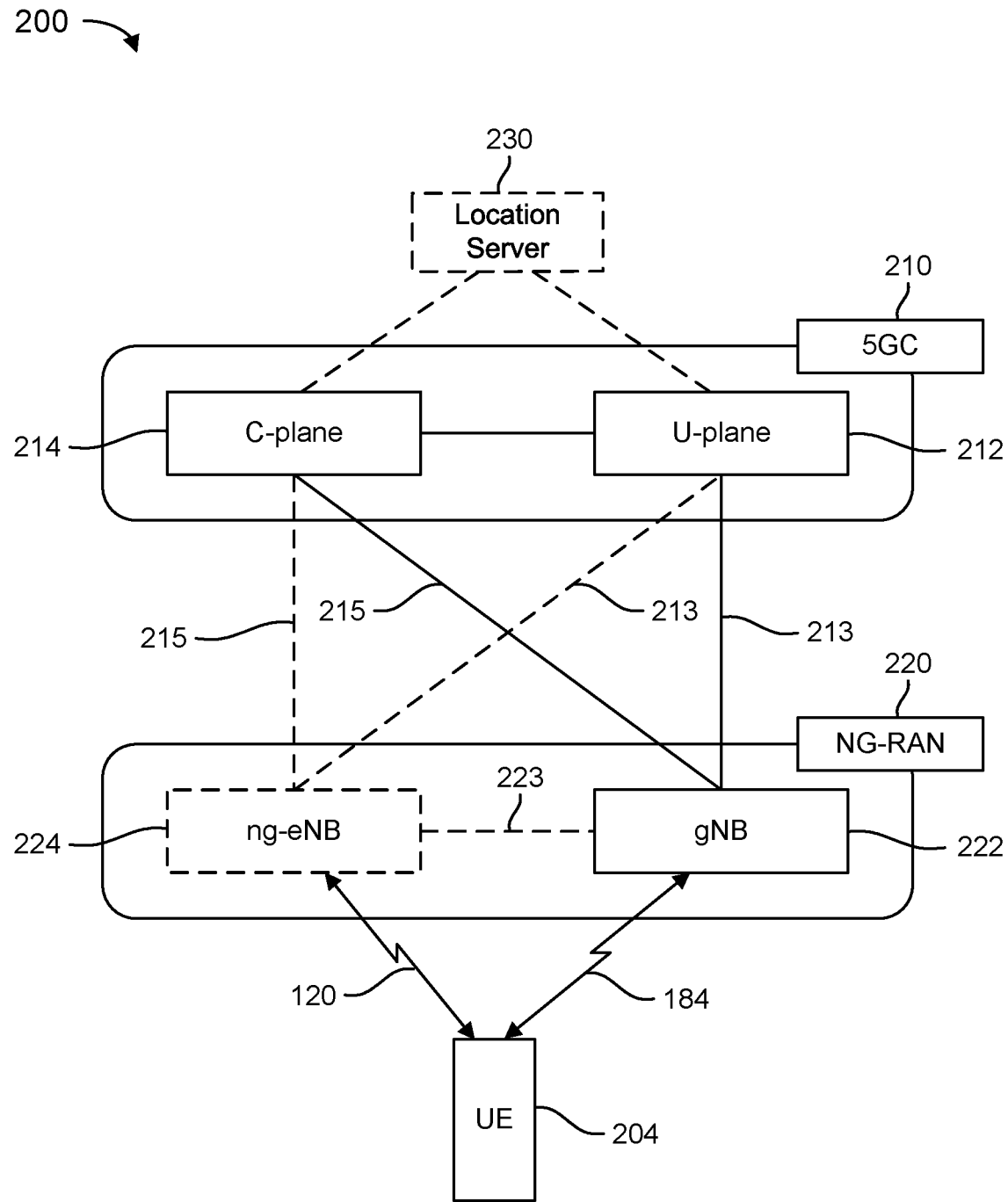
FIGS. 2A and 2B illustrate example wireless network structures according to various aspects.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
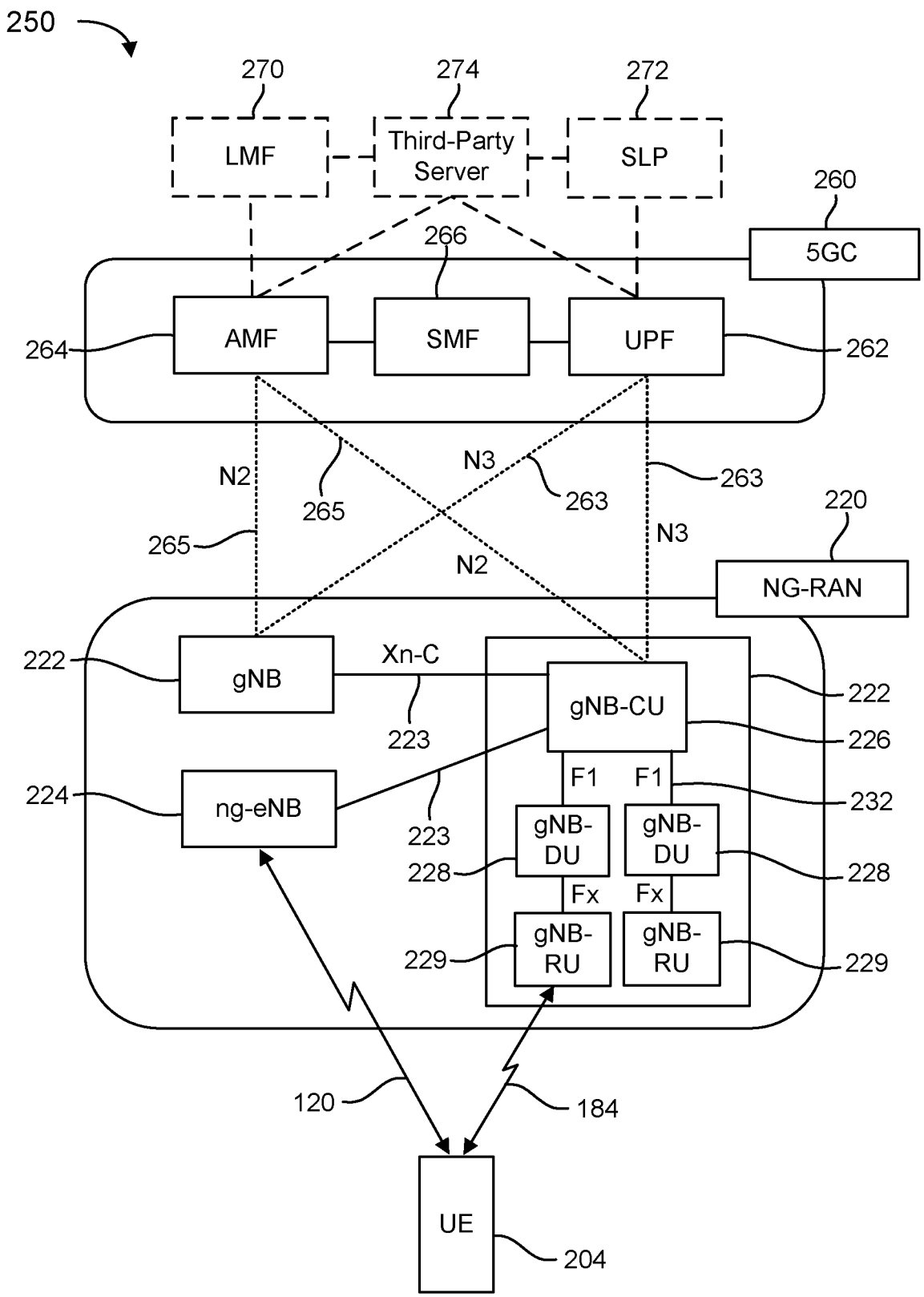

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
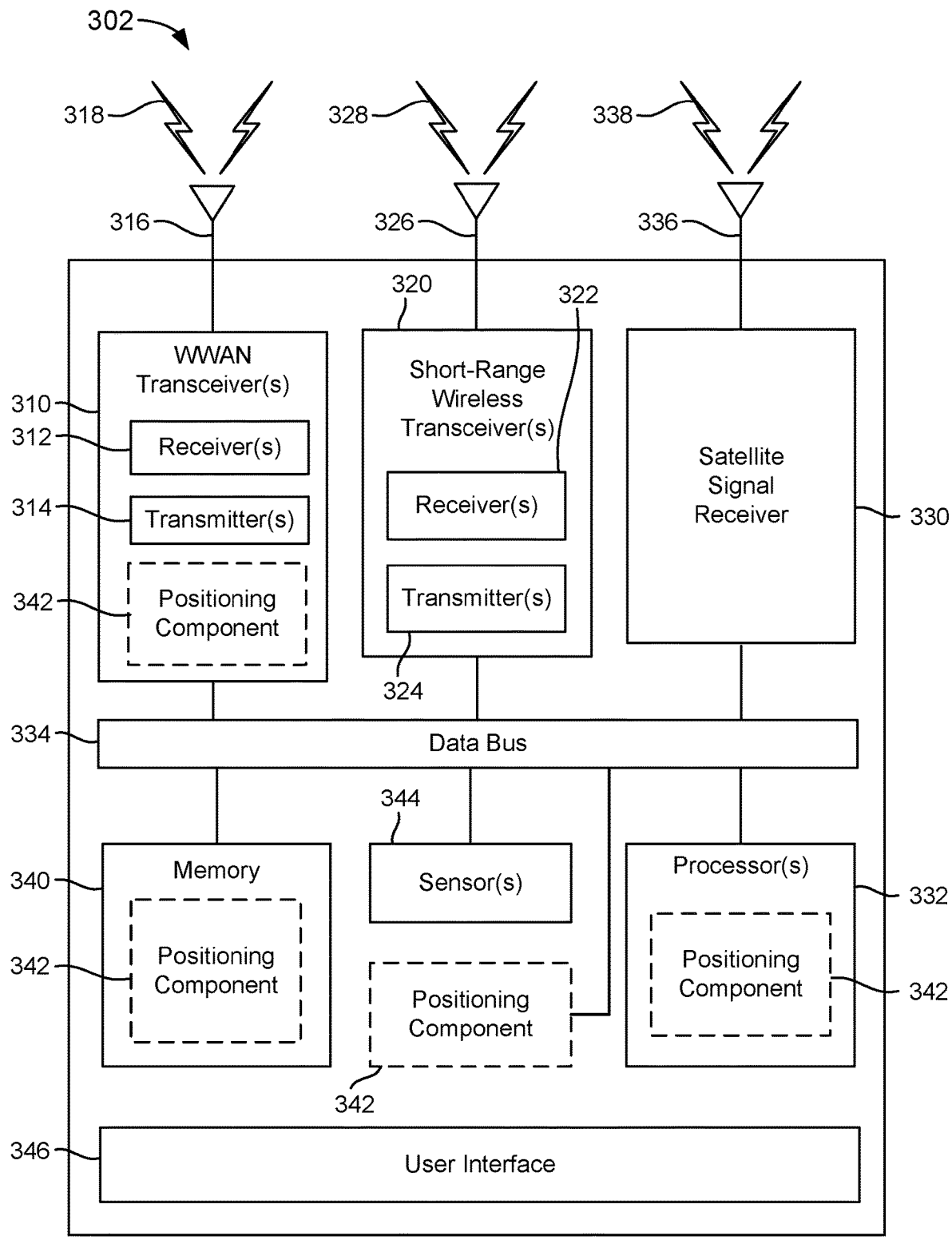
FIGS. 3A, 3B, and 3C are simplified block diagrams of several sample aspects of components that may be employed in a user equipment (UE), a base station, and a network entity, respectively, and configured to support communications as taught herein.
Figure 3B:
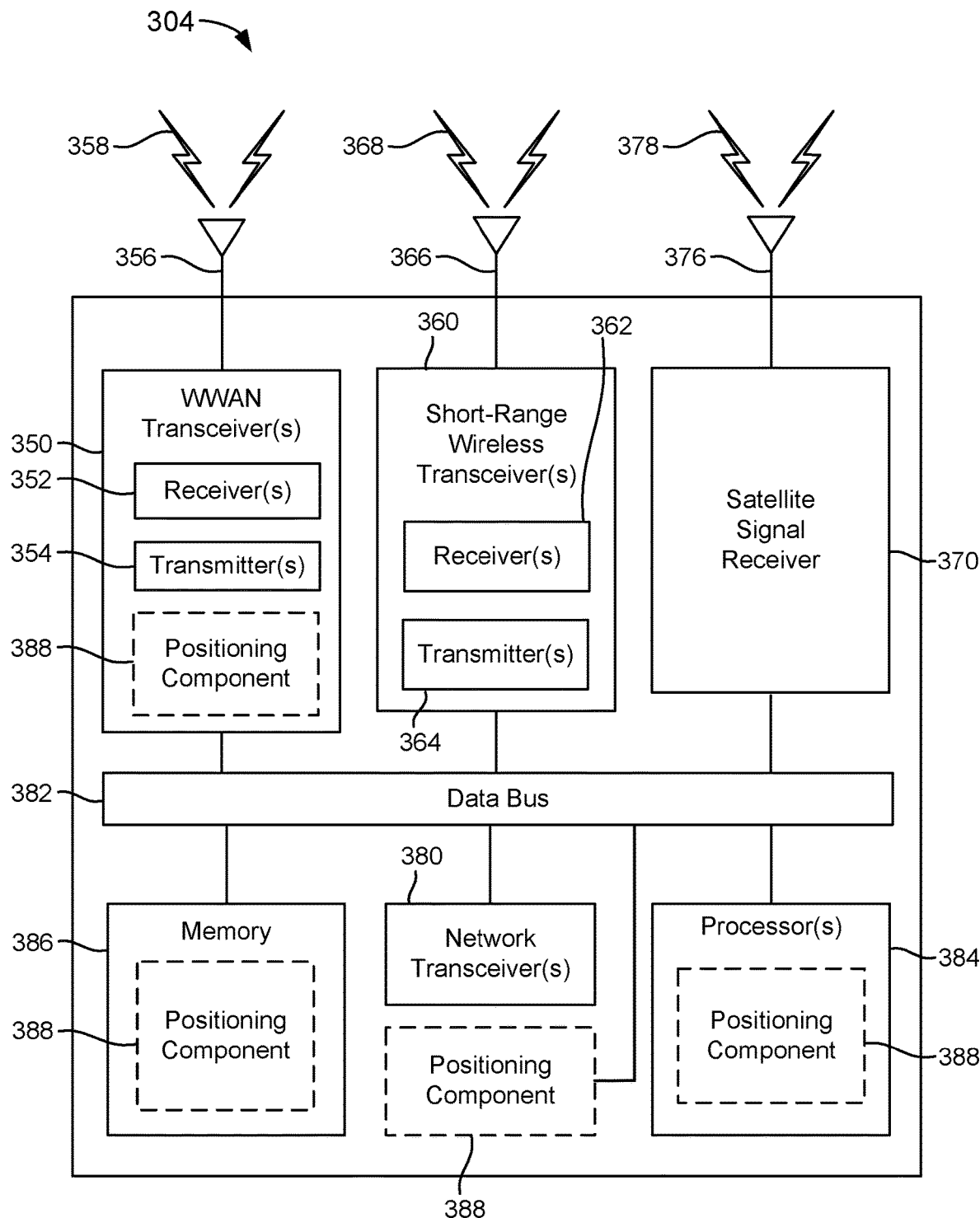
Figure 3C:
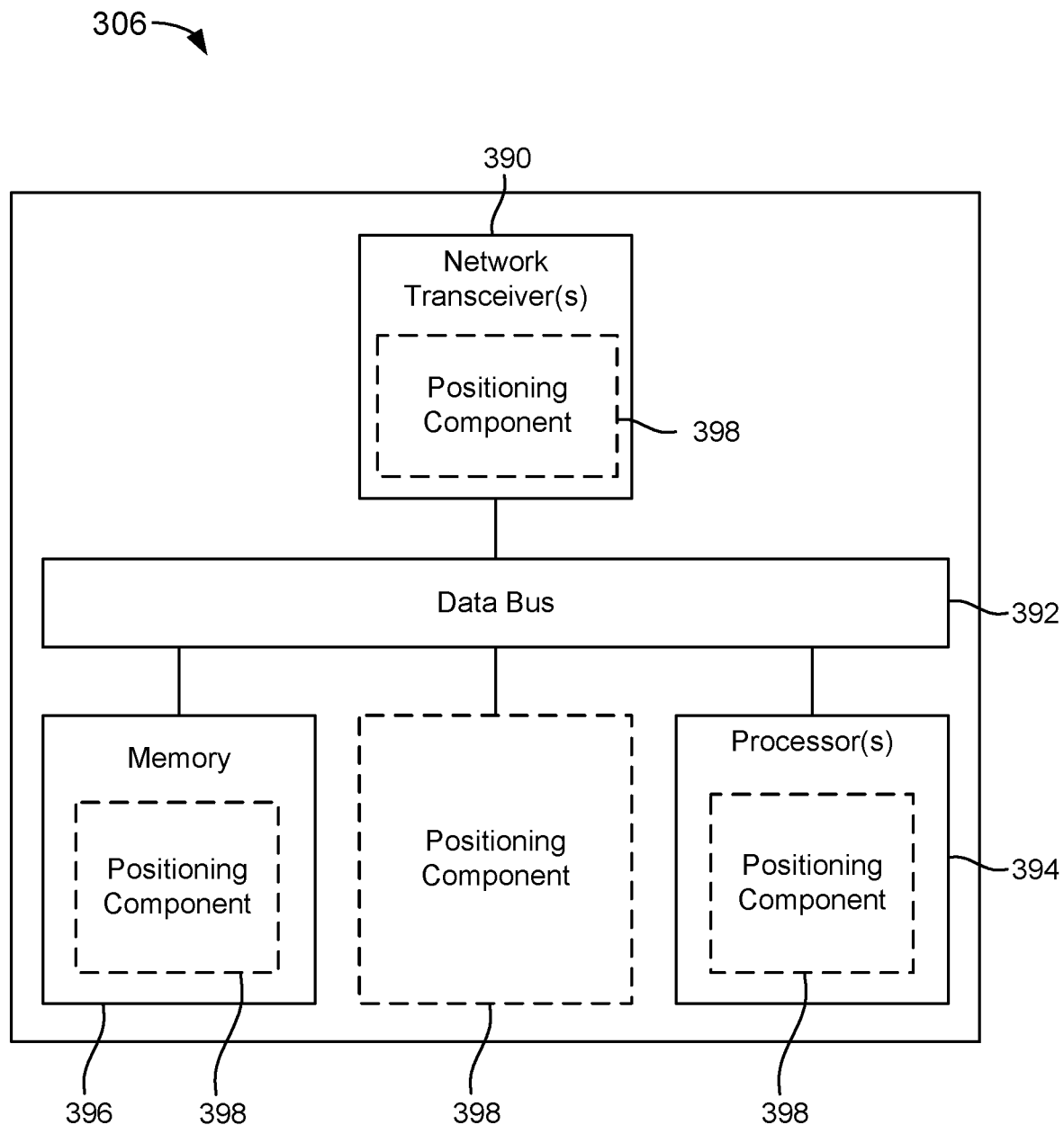

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be determined (e.g., using trilateration or multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 172, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or combinations thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
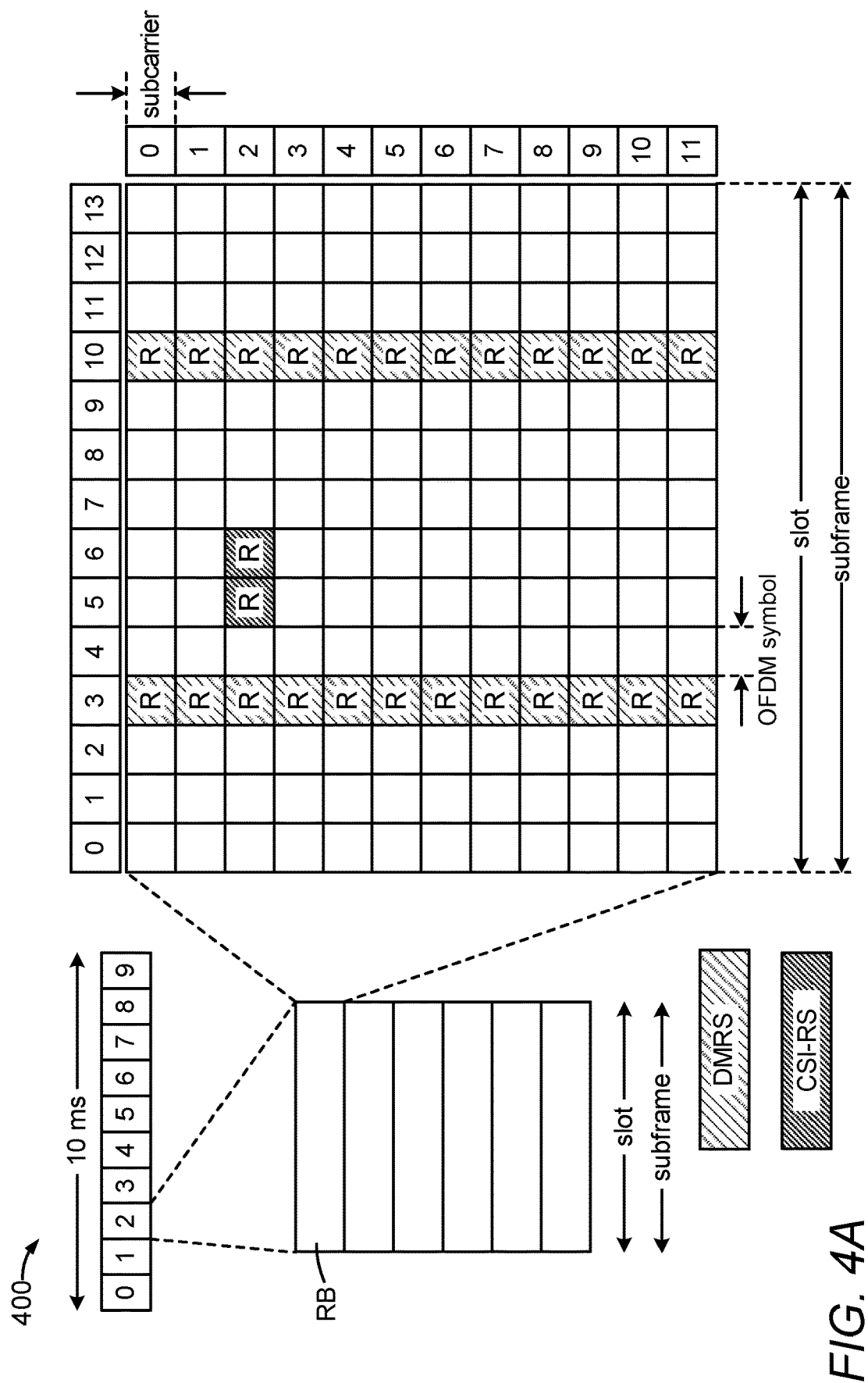
FIGS. 4A and 4B are diagrams illustrating examples of frame structures and channels within the frame structures, according to aspects of the disclosure.
Figure 4B:
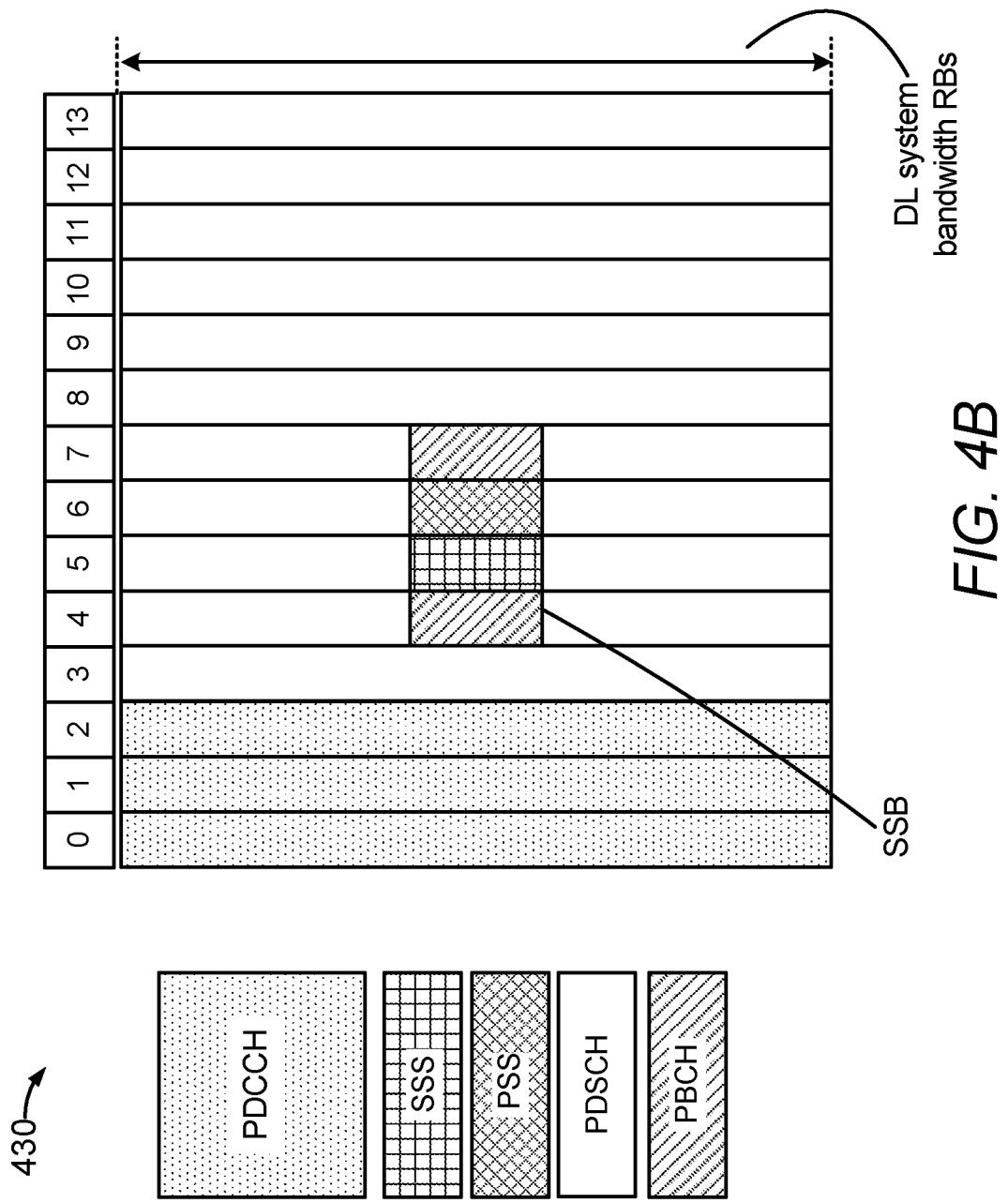

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz, and 204 kHz or greater may be available. Table 1 provided below lists some various parameters for different NR numerologies.

TABLE 1

| Subcarrier spacing (kHz) | Symbols/ slot | slots/ sub-frame | slots/ frame | slot (ms) | Symbol duration (µs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 200 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing.

Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages. In some cases, the DL RS illustrated in FIG. 4A may be positioning reference signals (PRS).

Figure 5:
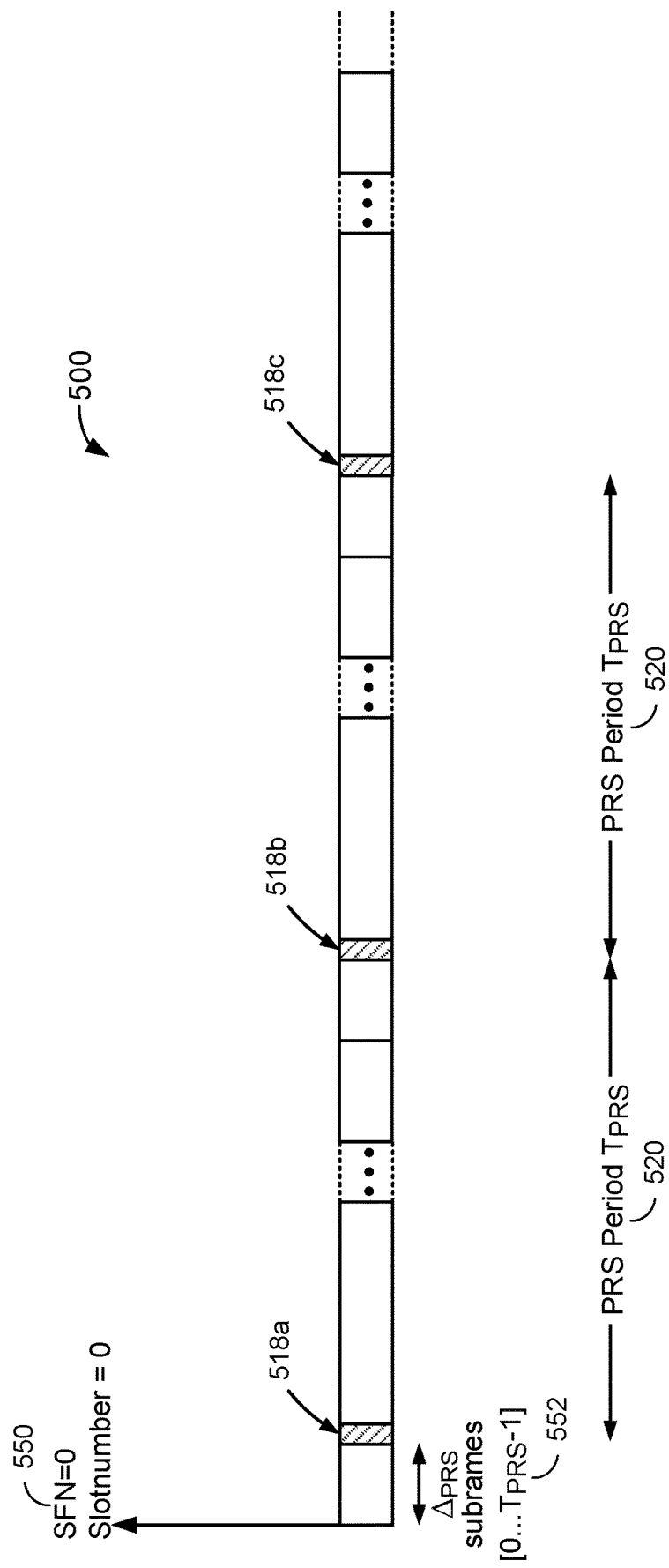
FIG. 5 illustrates an exemplary positioning reference signal (PRS) configuration for a cell supported by a wireless node.

FIG. 5 illustrates an exemplary PRS configuration 500 for a cell supported by a wireless node (such as a base station 102). FIG. 5 shows how PRS positioning occasions are determined by a system frame number (SFN), a cell specific subframe offset ($\Delta_{PRS}$) 552, and the PRS periodicity ($T_{PRS}$) 520. Typically, the cell specific PRS subframe configuration is defined by a "PRS Configuration Index" $I_{PRS}$ included in observed time difference of arrival (OTDOA) assistance data. The PRS periodicity ($T_{PRS}$) 520 and the cell specific subframe offset (APRs) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | | Reserved |

A PRS configuration is defined with reference to the SFN of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and APRS is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes (NPRs) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta$PRS using Table 2. The UE may then determine the radio frame, subframe, and slot when a PRS is scheduled in the cell (e.g., using Equation (1)). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

A collection of resource elements that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). In some designs, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE or NR systems. However, as used herein, unless otherwise indicated, the terms "positioning reference signal" and "PRS" refer to any type of reference signal that can be used for positioning, such as but not limited to, PRS signals in LTE or NR, navigation reference signals (NRSs) in 5G, transmitter reference signals (TRSs), cell-specific reference signals (CRSs), channel state information reference signals (CSI-RSs), primary synchronization signals (PSSs), secondary synchronization signals (SSSs), SSB, etc.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, SRSs in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time, and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook-based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \le N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range $0, 1, \ldots, K_{TC}-1$ REs. Thus, for comb spacing $K_{TC}=2$, there are 2 different combs available for multiplexing if needed, and for comb spacing $K_{TC}=4$, there are 4 different available combs.

Periodicity and slot offset for the case of periodic/semi-persistent SRS.

Sounding bandwidth within a bandwidth part.

For low latency positioning, a gNB may trigger a UL SRS-P via a DCI (e.g., transmitted SRS-P may include repetition or beam-sweeping to enable several gNBs to receive the SRS-P). Alternatively, the gNB may send information regarding aperiodic PRS transmission to the UE (e.g., this configuration may include information about PRS from multiple gNBs to enable the UE to perform timing computations for positioning (UE-based) or for reporting (UE-assisted). While various embodiments of the present disclosure relate to DL PRS-based positioning procedures, some or all of such embodiments may also apply to UL SRS—P-based positioning procedures.

Note that the terms "sounding reference signal", "SRS" and "SRS-P" may sometimes refer to specific reference signals that are used for positioning in LTE or NR systems. However, as used herein, unless otherwise indicated, the terms "sounding reference signal", "SRS" and "SRS-P" refer to any type of reference signal that can be used for positioning, such as but not limited to, SRS signals in LTE or NR, navigation reference signals (NRSs) in 5G, transmitter reference signals (TRSs), random access channel (RACH) signals for positioning (e.g., RACH preambles, such as Msg-1 in 4-Step RACH procedure or Msg-A in 2-Step RACH procedure), etc.

3GPP Rel. 16 introduced various NR positioning aspects directed to increase location accuracy of positioning schemes that involve measurement(s) associated with one or more UL or DL PRSs (e.g., higher bandwidth (BW), FR2 beam-sweeping, angle-based measurements such as Angle of Arrival (AoA) and Angle of Departure (AoD) measurements, multi-cell Round-Trip Time (RTT) measurements, etc.). If latency reduction is a priority, then UE-based positioning techniques (e.g., DL-only techniques without UL location measurement reporting) are typically used. However, if latency is less of a concern, then UE-assisted positioning techniques can be used, whereby UE-measured data is reported to a network entity (e.g., location server 230, LMF 270, etc.). Latency associated UE-assisted positioning techniques can be reduced somewhat by implementing the LMF in the RAN.

Layer-3 (L3) signaling (e.g., RRC or Location Positioning Protocol (LPP)) is typically used to transport reports that comprise location-based data in association with UE-assisted positioning techniques. L3 signaling is associated with relatively high latency (e.g., above 100 ms) compared with Layer-1 (L1, or PHY layer) signaling or Layer-2 (L2, or MAC layer) signaling. In some cases, lower latency (e.g., less than 100 ms, less than 10 ms, etc.) between the UE and the RAN for location-based reporting may be desired. In such cases, L3 signaling may not be capable of reaching these lower latency levels. L3 signaling of positioning measurements may comprise any combination of the following:

One or multiple TOA, TDOA, RSRP or Rx-Tx measurements,

One or multiple AoA/AoD (e.g., currently agreed only for gNB->LMF reporting DL AoA and UL AoD) measurements, One or multiple Multipath reporting measurements, e.g., per-path ToA, RSRP, AoA/AoD (e.g., currently only per-path ToA allowed in LTE)

One or multiple motion states (e.g., walking, driving, etc.) and trajectories (e.g., currently for UE), and/or One or multiple report quality indications.

More recently, L1 and L2 signaling has been contemplated for use in association with PRS-based reporting. For example, L1 and L2 signaling is currently used in some systems to transport CSI reports (e.g., reporting of Channel Quality Indications (CQIs), Precoding Matrix Indicators (PMIs), Layer Indicators (Lis), L1-RSRP, etc.). CSI reports may comprise a set of fields in a pre-defined order (e.g., defined by the relevant standard). A single UL transmission (e.g., on PUSCH or PUCCH) may include multiple reports, referred to herein as 'sub-reports', which are arranged according to a pre-defined priority (e.g., defined by the relevant standard). In some designs, the pre-defined order may be based on an associated sub-report periodicity (e.g., aperiodic/semi-persistent/periodic (A/SP/P) over PUSCH/PUCCH), measurement type (e.g., L1-RSRP or not), serving cell index (e.g., in carrier aggregation (CA) case), and reportconfigID. With 2-part CSI reporting, the part 1s of all reports are grouped together, and the part 2s are grouped separately, and each group is separately encoded (e.g., part 1 payload size is fixed based on configuration parameters, while part 2 size is variable and depends on configuration parameters and also on associated part 1 content). A number of coded bits/symbols to be output after encoding and rate-matching is computed based on a number of input bits and beta factors, per the relevant standard. Linkages (e.g., time offsets) are defined between instances of RSs being measured and corresponding reporting. In some designs, CSI-like reporting of PRS-based measurement data using L1 and L2 signaling may be implemented.

Figure 6:
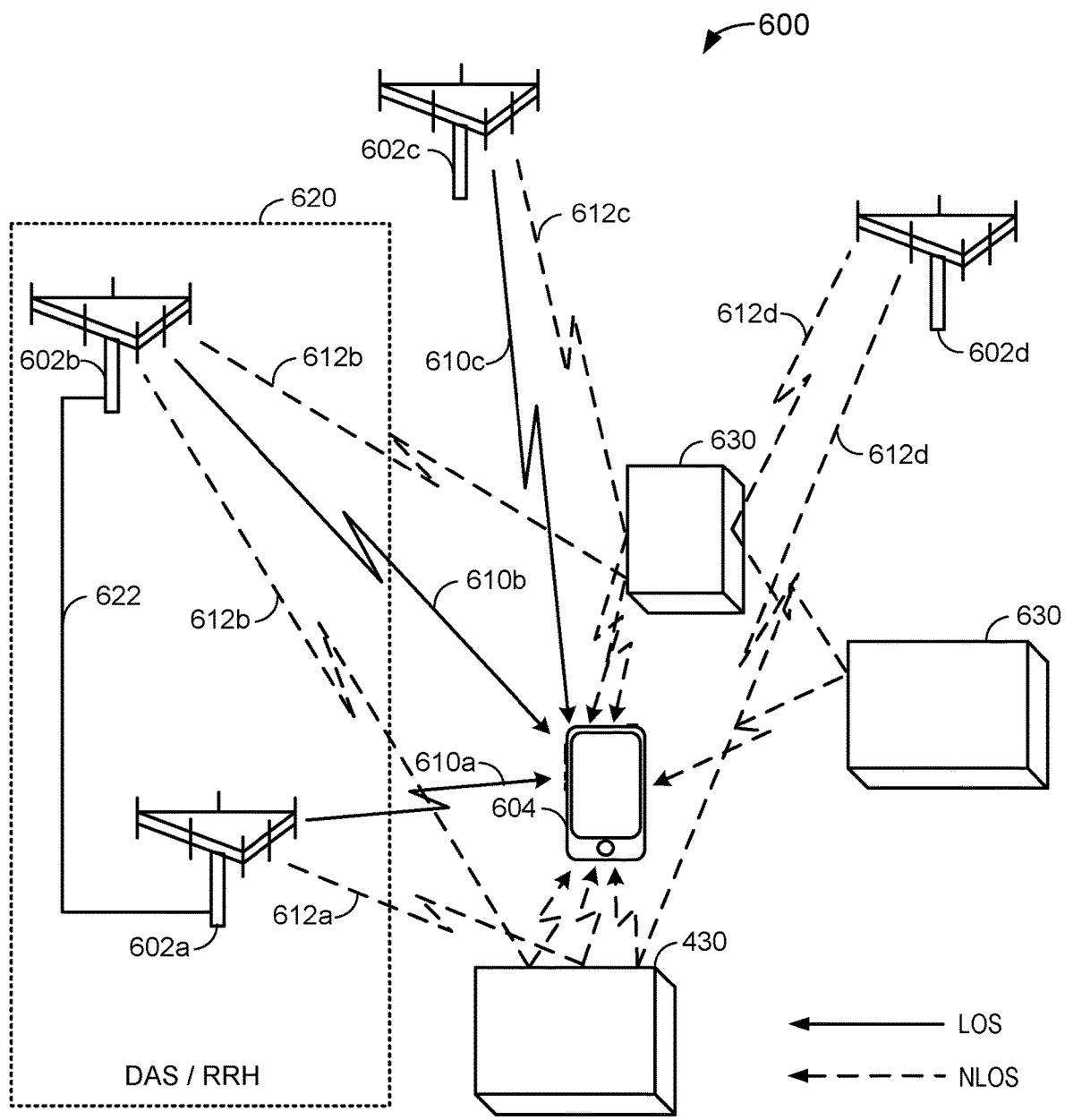
FIG. 6 illustrates an exemplary wireless communications system according to various aspects of the disclosure.

FIG. 6 illustrates an exemplary wireless communications system 600 according to various aspects of the disclosure. In the example of FIG. 6, a UE 604, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third-party application, etc.) to calculate an estimate of its position. The UE 604 may communicate wirelessly with a plurality of base stations 602a-d (collectively, base stations 602), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and four base stations 602, as will be appreciated, there may be more UEs 604 and more or fewer base stations 602.

To support position estimates, the base stations 602 may be configured to broadcast reference RF signals (e.g., Positioning Reference Signals (PRS), Cell-specific Reference Signals (CRS), Channel State Information Reference Signals (CSI-RS), synchronization signals, etc.) to UEs 604 in their coverage areas to enable a UE 604 to measure reference RF signal timing differences (e.g., OTDOA or reference signal time difference (RSTD)) between pairs of network nodes and/or to identify the beam that best excite the LOS or shortest radio path between the UE 604 and the transmitting base stations 602. Identifying the LOS/shortest path beam(s) is of interest not only because these beams can subsequently be used for OTDOA measurements between a pair of base stations 602, but also because identifying these beams can directly provide some positioning information based on the beam direction. Moreover, these beams can subsequently be used for other position estimation methods that require precise ToA, such as round-trip time estimation-based methods.

As used herein, a "network node" may be a base station 602, a cell of a base station 602, a remote radio head, an antenna of a base station 602, where the locations of the antennas of a base station 602 are distinct from the location of the base station 602 itself, or any other network entity capable of transmitting reference signals. Further, as used herein, a "node" may refer to either a network node or a UE.

A location server (e.g., location server 230) may send assistance data to the UE 604 that includes an identification of one or more neighbor cells of base stations 602 and configuration information for reference RF signals transmitted by each neighbor cell. Alternatively, the assistance data can originate directly from the base stations 602 themselves (e.g., in periodically broadcasted overhead messages, etc.). Alternatively, the UE 604 can detect neighbor cells of base stations 602 itself without the use of assistance data. The UE 604 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 602 or antenna(s) that transmitted the reference RF signals that the UE 604 measured), the UE 604 or the location server can determine the distance between the UE 604 and the measured network nodes and thereby calculate the location of the UE 604.

The term "position estimate" is used herein to refer to an estimate of a position for a UE 604, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 602) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 604) and a neighbor base station whose reference RF signals the UE is measuring. Thus, FIG. 6 illustrates an aspect in which base stations 602*a* and 602*b* form a DAS/RRH 620. For example, the base station 602*a* may be the serving base station of the UE 604 and the base station 602*b* may be a neighbor base station of the UE 604. As such, the base station 602*b* may be the RRH of the base station 602*a*. The base stations 602*a* and 602*b* may communicate with each other over a wired or wireless link 622.

To accurately determine the position of the UE 604 using the OTDOAs and/or RSTDs between RF signals received from pairs of network nodes, the UE 604 needs to measure the reference RF signals received over the LOS path (or the shortest NLOS path where an LOS path is not available), between the UE 604 and a network node (e.g., base station 602, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 6 illustrates a number of LOS paths 610 and a number of NLOS paths 612 between the base stations 602 and the UE 604. Specifically, FIG. 6 illustrates base station 602*a* transmitting over an LOS path 610*a* and an NLOS path 612*a*, base station 602*b* transmitting over an LOS path 610*b* and two NLOS paths 612*b*, base station 602*c* transmitting over an LOS path 610*c* and an NLOS path 612*c*, and base station 602*d* transmitting over two NLOS paths 612*d*. As illustrated in FIG. 6, each NLOS path 612 reflects off some object 630 (e.g., a building). As will be appreciated, each LOS path 610 and NLOS path 612 transmitted by a base station 602 may be transmitted by different antennas of the base station 602 (e.g., as in a MIMO system), or may be transmitted by the same antenna of a base station 602 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 602 may be configured to use beamforming to transmit RF signals. In that case, some of the available beams may focus the transmitted RF signal along the LOS paths 610 (e.g., the beams produce highest antenna gain along the LOS paths) while other available beams may focus the transmitted RF signal along the NLOS paths 612. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 602 uses beamforming to transmit RF signals, the beams of interest for data communication between the base station 602 and the UE 604 will be the beams carrying RF signals that arrive at UE 604 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 610). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 7, in some cases, the signal strength of RF signals on the LOS path 610 may be weaker (e.g., due to obstructions) than the signal strength of RF signals on an NLOS path 612, over which the RF signals arrive later due to propagation delay.

Figure 7:
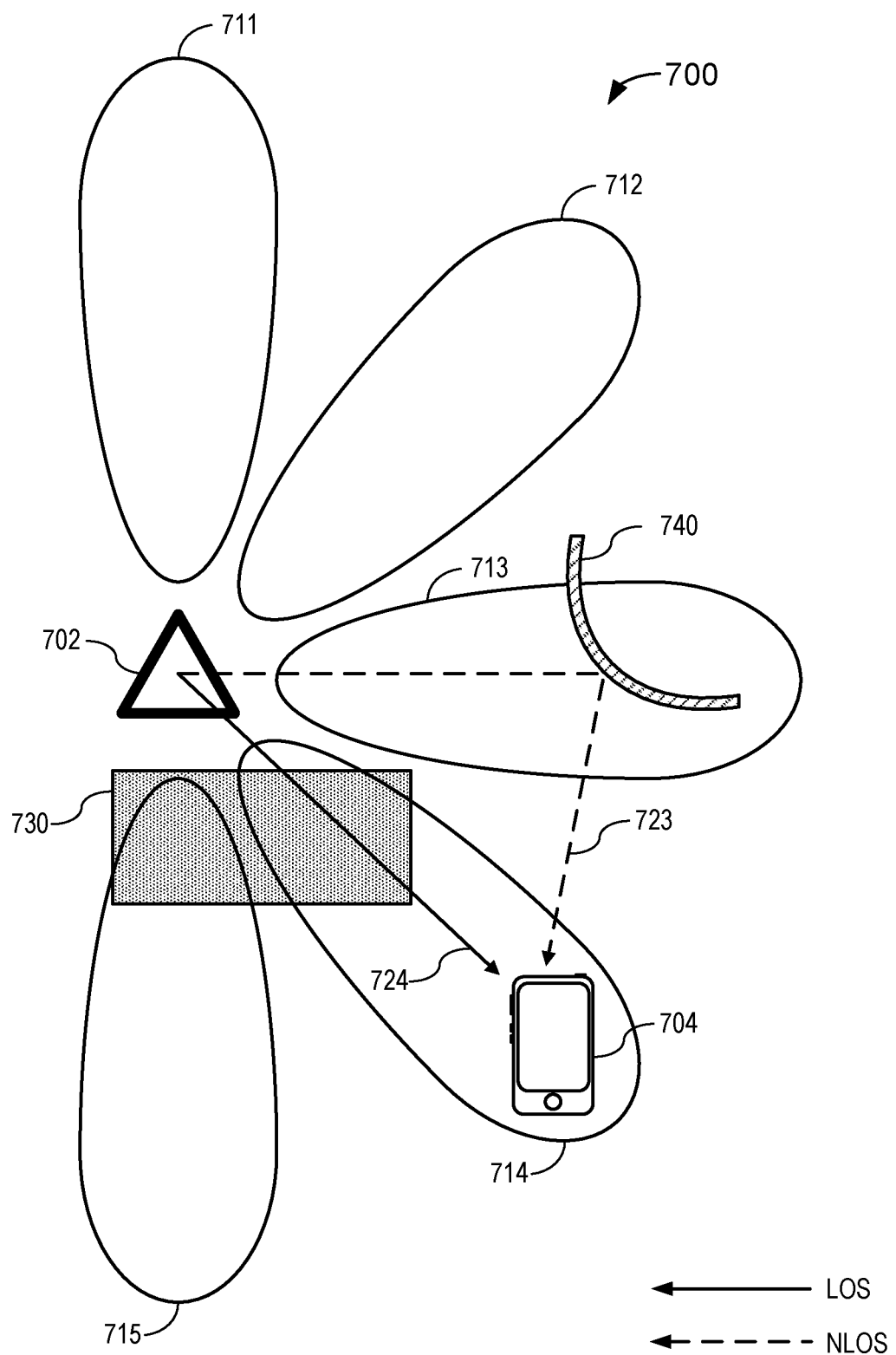
FIG. 7 illustrates an exemplary wireless communications system according to various aspects of the disclosure.

FIG. 7 illustrates an exemplary wireless communications system 700 according to various aspects of the disclosure. In the example of FIG. 7, a UE 704, which may correspond to UE 604 in FIG. 6, is attempting to calculate an estimate of its position, or to assist another entity (e.g., a base station or core network component, another UE, a location server, a third-party application, etc.) to calculate an estimate of its position. The UE 704 may communicate wirelessly with a base station 702, which may correspond to one of base stations 602 in FIG. 6, using RF signals and standardized protocols for the modulation of the RF signals and the exchange of information packets.

As illustrated in FIG. 7, the base station 702 is utilizing beamforming to transmit a plurality of beams 711-715 of RF signals. Each beam 711-715 may be formed and transmitted by an array of antennas of the base station 702. Although FIG. 7 illustrates a base station 702 transmitting five beams 711-715, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 711-715 for purposes of distinguishing RF signals associated with one beam from RF signals associated with another beam. Moreover, the RF signals associated with a particular beam of the plurality of beams 711-715 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 7, the UE 704 receives an NLOS data stream 723 of RF signals transmitted on beam 713 and an LOS data stream 724 of RF signals transmitted on beam 714. Although FIG. 7 illustrates the NLOS data stream 723 and the LOS data stream 724 as single lines (dashed and solid, respectively), as will be appreciated, the NLOS data stream 723 and the LOS data stream 724 may each comprise multiple rays (i.e., a "cluster") by the time they reach the UE 704 due, for example, to the propagation characteristics of RF signals through multipath channels. For example, a cluster of RF signals is formed when an electromagnetic wave is reflected off of multiple surfaces of an object, and reflections arrive at the receiver (e.g., UE 704) from roughly the same angle, each travelling a few wavelengths (e.g., centimeters) more or less than others. A "cluster" of received RF signals generally corresponds to a single transmitted RF signal.

In the example of FIG. 7, the NLOS data stream 723 is not originally directed at the UE 704, although, as will be appreciated, it could be, as are the RF signals on the NLOS paths 612 in FIG. 6. However, it is reflected off a reflector 740 (e.g., a building) and reaches the UE 704 without obstruction, and therefore, may still be a relatively strong RF signal. In contrast, the LOS data stream 724 is directed at the UE 704 but passes through an obstruction 730 (e.g., vegetation, a building, a hill, a disruptive environment such as clouds or smoke, etc.), which may significantly degrade the RF signal. As will be appreciated, although the LOS data stream 724 is weaker than the NLOS data stream 723, the LOS data stream 724 will arrive at the UE 704 before the NLOS data stream 723 because it follows a shorter path from the base station 702 to the UE 704.

As noted above, the beam of interest for data communication between a base station (e.g., base station 702) and a UE (e.g., UE 704) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 714). That is, even if beam 713 (the NLOS beam) were to weakly excite the LOS path (due to the propagation characteristics of RF signals, even though not being focused along the LOS path), that weak signal, if any, of the LOS path of beam 713 may not be as reliably detectable (compared to that from beam 714), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 7, where the UE 704 is engaged in a data communication session with the base station 702 (e.g., where the base station 702 is the serving base station for the UE 704) and not simply attempting to measure reference RF signals transmitted by the base station 702, the beam of interest for the data communication session may be the beam 713, as it is carrying the unobstructed NLOS data stream 723. The beam of interest for position estimation, however, would be the beam 714, as it carries the strongest LOS data stream 724, despite being obstructed.

Figure 8A:
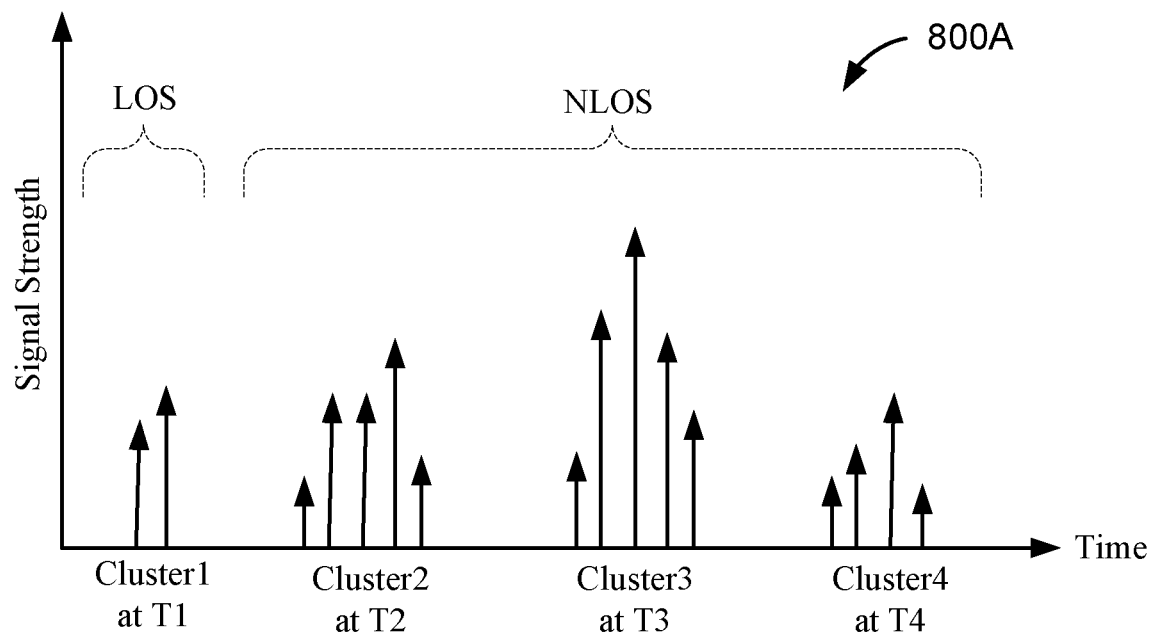
FIG. 8A is a graph showing the radio frequency (RF) channel response at a receiver over time according to aspects of the disclosure.

FIG. 8A is a graph 800A showing the RF channel response at a receiver (e.g., UE 704) over time according to aspects of the disclosure. Under the channel illustrated in FIG. 8A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 8A, because the first cluster of RF signals at time T1 arrives first, it is presumed to be the LOS data stream (i.e., the data stream arriving over the LOS or the shortest path), and may correspond to the LOS data stream 724. The third cluster at time T3 is comprised of the strongest RF signals, and may correspond to the NLOS data stream 723. Seen from the transmitter's side, each cluster of received RF signals may comprise the portion of an RF signal transmitted at a different angle, and thus each cluster may be said to have a different angle of departure (AoD) from the transmitter.

Figure 8B:
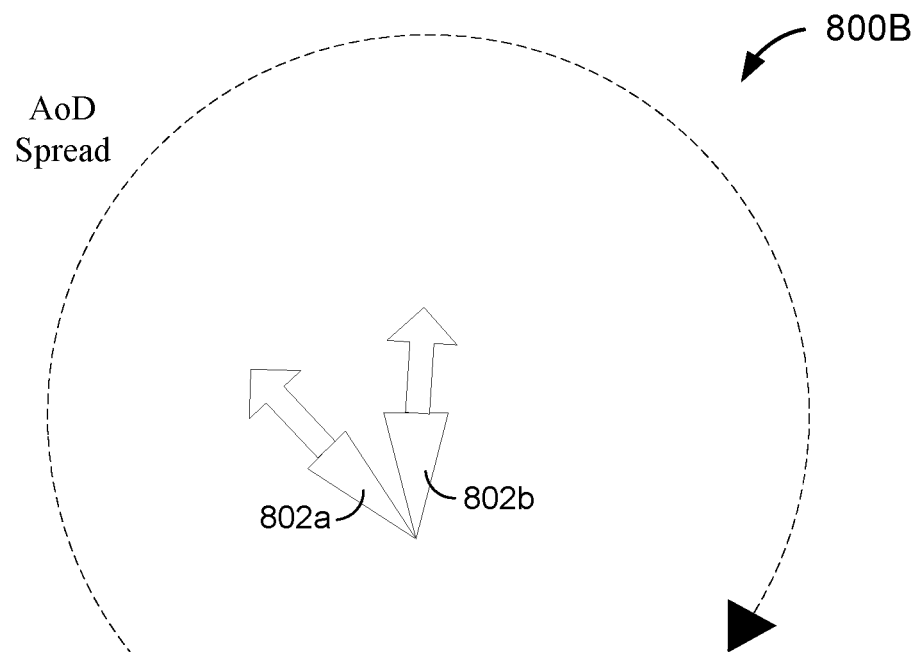
FIG. 8B is a diagram illustrating this separation of clusters in angle of departure (AoD).

FIG. 8B is a diagram 800B illustrating this separation of clusters in AoD. The RF signal transmitted in AoD range 802a may correspond to one cluster (e.g., "Cluster1") in FIG. 8A, and the RF signal transmitted in AoD range 802b may correspond to a different cluster (e.g., "Cluster3") in FIG. 8A. Note that although AoD ranges of the two clusters depicted in FIG. 8B are spatially isolated, AoD ranges of some clusters may also partially overlap even though the clusters are separated in time. For example, this may arise when two separate buildings at same AoD from the transmitter reflect the signal towards the receiver. Note that although FIG. 8A illustrates clusters of two to five channel taps (or "peaks"), as will be appreciated, the clusters may have more or fewer than the illustrated number of channel taps.

RAN1 NR may define UE measurements on DL reference signals (e.g., for serving, reference, and/or neighboring cells) applicable for NR positioning, including DL reference signal time difference (RSTD) measurements for NR positioning, DL RSRP measurements for NR positioning, and UE Rx-Tx (e.g., a hardware group delay from signal reception at UE receiver to response signal transmission at UE transmitter, e.g., for time difference measurements for NR positioning, such as RTT).

RANI NR may define gNB measurements based on UL reference signals applicable for NR positioning, such as relative UL time of arrival (RTOA) for NR positioning, UL AoA measurements (e.g., including Azimuth and Zenith Angles) for NR positioning, UL RSRP measurements for NR positioning, and gNB Rx-Tx (e.g., a hardware group delay from signal reception at gNB receiver to response signal transmission at gNB transmitter, e.g., for time difference measurements for NR positioning, such as RTT).

Figure 9:
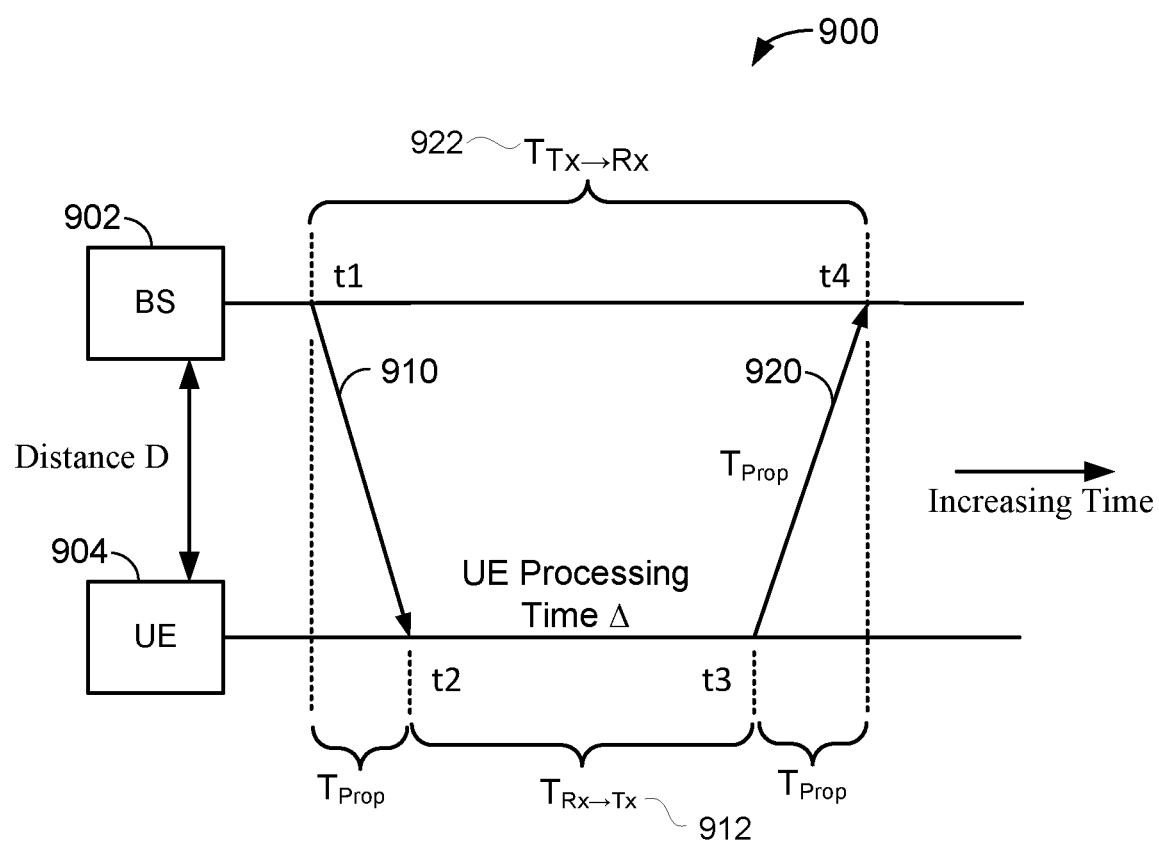
FIG. 9 is a diagram showing exemplary timings of round-trip-time (RTT) measurement signals exchanged between a base station and a UE, according to aspects of the disclosure.

FIG. 9 is a diagram 900 showing exemplary timings of RTT measurement signals exchanged between a base station 902 (e.g., any of the base stations described herein) and a UE 904 (e.g., any of the UEs described herein), according to aspects of the disclosure. In the example of FIG. 9, the base station 902 sends an RTT measurement signal 910 (e.g., PRS, NRS, CRS, CSI-RS, etc.) to the UE 904 at time $t_1$. The RTT measurement signal 910 has some propagation delay $T_{Prop}$ as it travels from the base station 902 to the UE 904. At time $t_2$ (the ToA of the RTT measurement signal 910 at the UE 904), the UE 904 receives/measures the RTT measurement signal 910. After some UE processing time, the UE 904 transmits an RTT response signal 920 at time $t_3$. After the propagation delay $T_{Prop}$, the base station 902 receives/measures the RTT response signal 920 from the UE 904 at time $t_4$ (the ToA of the RTT response signal 920 at the base station 902).

In order to identify the ToA (e.g., $t_2$) of a reference signal (e.g., an RTT measurement signal 910) transmitted by a given network node (e.g., base station 902), the receiver (e.g., UE 904) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may choose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

In some designs, the RTT response signal 920 may explicitly include the difference between time $t_3$ and time $t_2$ (i.e., $T_{Rx \to Tx}$ 912). Using this measurement and the difference between time $t_4$ and time $t_1$ (i.e., $T_{Tx \to Rx}$ 922), the base station 902 (or other positioning entity, such as location server 230, LMF 270) can calculate the distance to the UE 904 as:

$$d = \frac{1}{2c}(T_{Tx \to Rx} - T_{Rx \to Tx}) = \frac{1}{2c}(t_2 - t_1) - \frac{1}{2c}(t_4 - t_3)$$

where c is the speed of light. While not illustrated expressly in FIG. 9, an additional source of delay or error may be due to UE and gNB hardware group delay for position location.

Various parameters associated with positioning can impact power consumption at the UE. Knowledge of such parameters can be used to estimate (or model) the UE power consumption. By accurately modeling the power consumption of the UE, various power saving features and/or performance enhancing features can be utilized in a predictive manner so as to improve the user experience. An additional source of delay or error is due to UE and gNB hardware group delay for position location.

Figure 10:
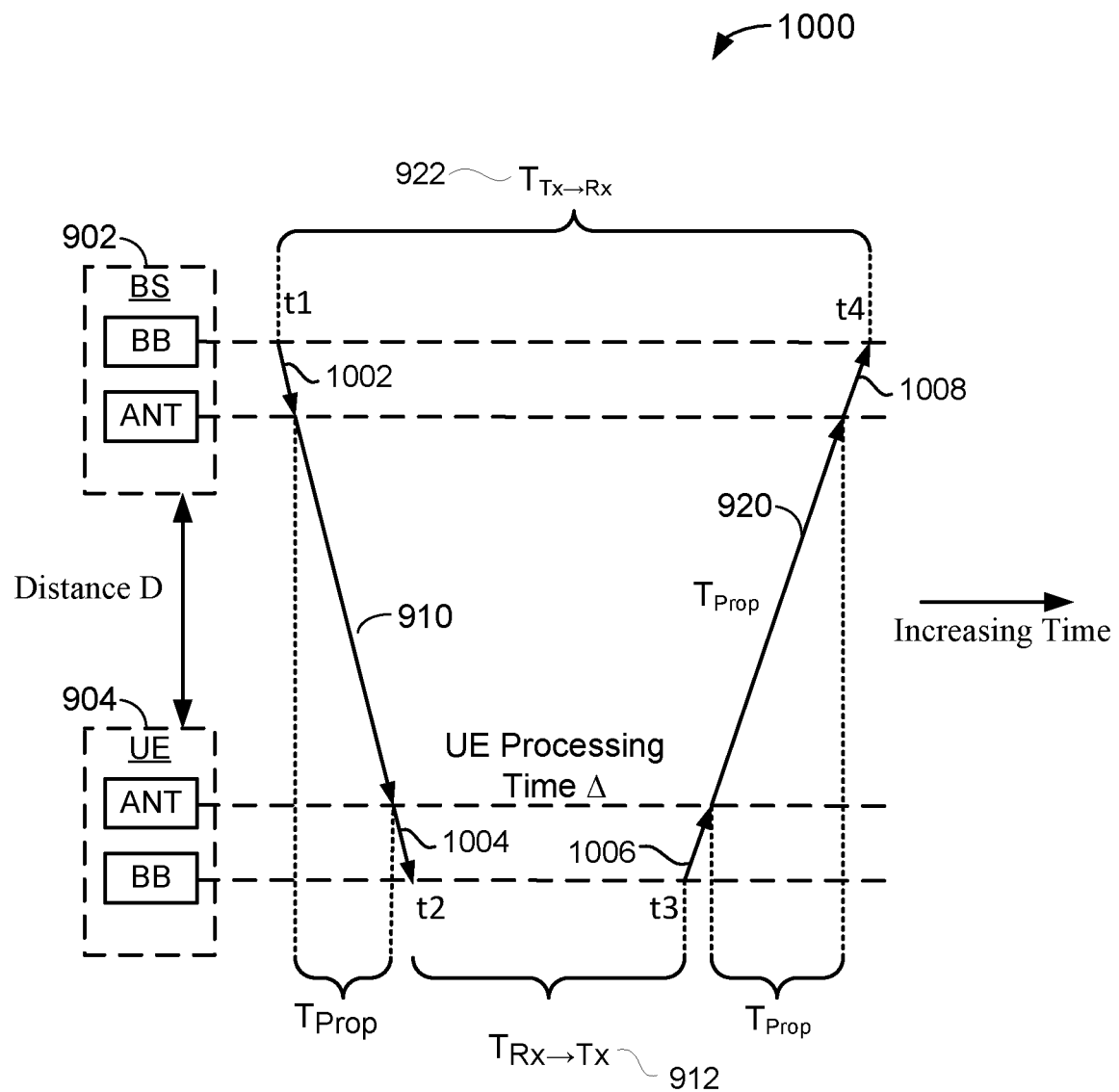
FIG. 10 is a diagram showing exemplary timings of RTT measurement signals exchanged between a base station and a UE, according to other aspects of the disclosure.

FIG. 10 illustrates a diagram 1000 showing exemplary timings of RTT measurement signals exchanged between a base station (gNB) (e.g., any of the base stations described herein) and a UE (e.g., any of the UEs described herein), according to aspects of the disclosure. FIG. 10 is similar in some respects to FIG. 9. However, in FIG. 10, the UE and gNB hardware group delay (which is primarily due to internal hardware delays between a baseband (BB) component and antenna (ANT) at the UE and gNB) is shown with respect 1002-1008. As will be appreciated, both Tx-side and Rx-side path-specific or beam-specific delays impact the RTT measurement. Hardware group delays such as 1002-1008 can contribute to timing errors and/or calibration errors that can impact RTT as well as other measurements such as TDOA, RSTD, and so on, which in turn can impact positioning performance. For example, in some designs, 10 nsec of error will introduce the 3 meter of error in the final fix.

Carrier Phase Based Positioning

Any range (distance) $\rho$ can be represented as an integer number of full cycles N plus a fractional carrier phase $\theta = \theta(t) - \theta_0$, where $\theta_0$ is the initial phase at transmitter side and $\theta(t)$ is the phase measured at the receiver. N cannot be measured directly, but $\theta(t)$ can be. The equation for $\rho$ is shown below:

$$\rho = \lambda \left( N + \frac{\theta(t) - \theta_0}{2\pi} \right)$$

where $\lambda$ is the wavelength of the radio frequency. Carrier phase-based positioning has been well studied in GNSS systems. Using GNSS carrier phase measurements in addition to pseudorange measurements, a GNSS receiver could reach 0.01~0.1 m accuracy. The equation above can be rewritten as:

$\rho = \lambda(\text{number of full cycles}) + \lambda(\text{fraction of one cycle})$ The number of full cycles can be determined by the code phase, and its resolution is a function of the code phase chip length, which is (1/chipping_rate). For GPS L1 signals, the code phase chip length is 300 m, but the carrier phase wavelength for GPS L1 is 19 cm, which means that carrier phase-based positioning provides a higher resolution measurement. However, the equations above require that the receiver have precise knowledge of the initial transmit phase ($\theta_0$), which may not be available.

Figure 11:
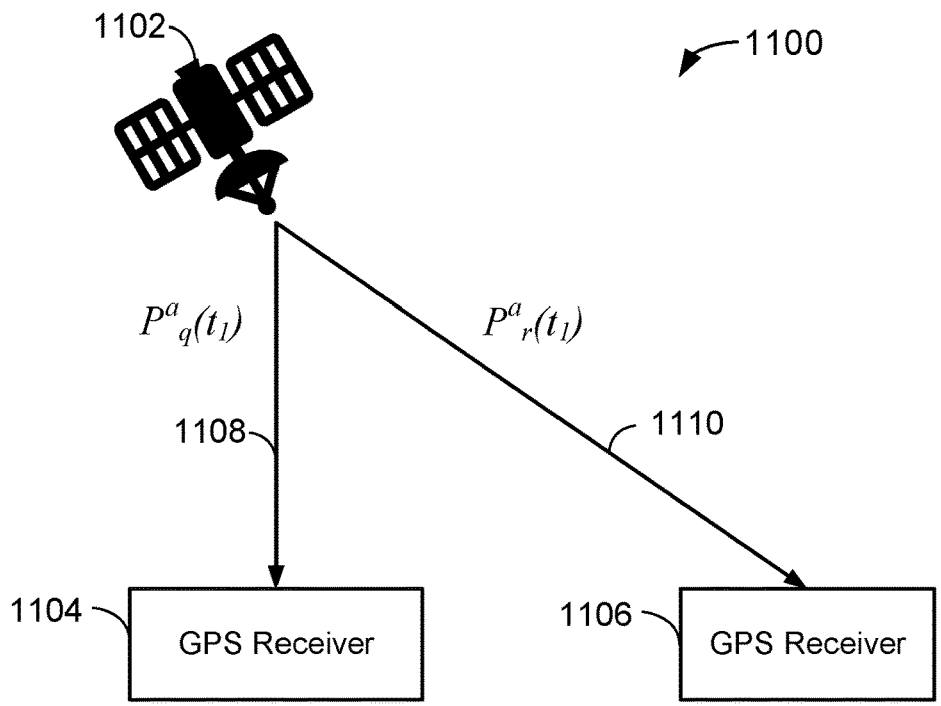
FIG. 11 illustrates a diagram depicting a satellite-based positioning scheme, and in particular a single-difference between receivers calculation.

In GNSS systems, carrier-phase based positioning is achieved by using a technique called real-time kinematics (RTK), which requires at least one more reference node to measure the same GNSS signal as target UE, which makes it possible to mathematically eliminate or mitigate various errors, such as satellite orbital error, satellite clock errors, and propagation errors. The measurement models at the receiver side contemplate timing and location errors:

$pr = \rho + d\rho + c(dt - dT) + d_{ion} + d_{trop} + \varepsilon_\rho$ $\varphi = \rho + d\rho + c(dt - dT) + d_{ion} + d_{trop} + \varepsilon_\varphi \lambda N$ where
pr=pseudorange (m)=
φ=carrier phase (m)

ρ=geometric range (m)
dρ=satellite orbital error (m)
c=the speed of light (m/s)
dt=satellite clock error (s)
dT=receiver clock error (s)
$d_{ion}$=ionospheric effect (m)
$d_{trop}$ tropospheric effect (m)
$\varepsilon_\rho$=pseudorange noise and multipath error (m)
$\varepsilon_\varphi$=carrier phase noise and multipath error (m) the carrier phase wavelength (m)
N=the number of full carrier cycles FIG. 11 illustrates a diagram 1100 depicting a satellite-based positioning scheme, and in particular a single-difference between receivers calculation. In FIG. 11, a GPS satellite 1102, a GPS receiver 1104 and a GPS receiver 1106 are depicted. GPS satellite 1102 transmits a GPS signal on a respective path 1108 with phase $P^a_q(t_1)$ to GPS receiver 1104, and on a respective path 1110 with phase $P^a_r(t_1)$ to GPS receiver 1106, whereby $$\Delta p = \Delta\rho + \Delta d\rho - c\Delta dT + \Delta d_{ion} + \Delta d_{trop} \varepsilon_{\Delta p}$$

$$\Delta\varphi = \Delta\rho + \Delta d\rho + c\Delta dT - \Delta d_{ion} + \Delta d_{trop} + \varepsilon_{\Delta\varphi} + \lambda\Delta N$$

In FIG. 11, GPS receiver 1104 may correspond to a base station or other reference node and GPS receiver 1106 may correspond to a roving station such as a UE. In this case, the base station measurement is subtracted from the rover station measurement for the same satellite 1102 so as to eliminate satellite clock error dt, reduce the satellite orbital error dρ as a function baseline length, to reduce the ionospheric and tropospheric effect, $d_{ion}$ and $d_{trop}$ as a function of baseline length, and to eliminate satellite initial phase $\phi_0$, i.e., $$\Delta\varphi = \varphi_C^1 - \varphi_D^1 = \varphi_C^1(t) - \phi_0 - (\varphi_D^1(t) - \phi_0) = \varphi_C^1(t) - \varphi_D^1(t)$$

Figure 12:
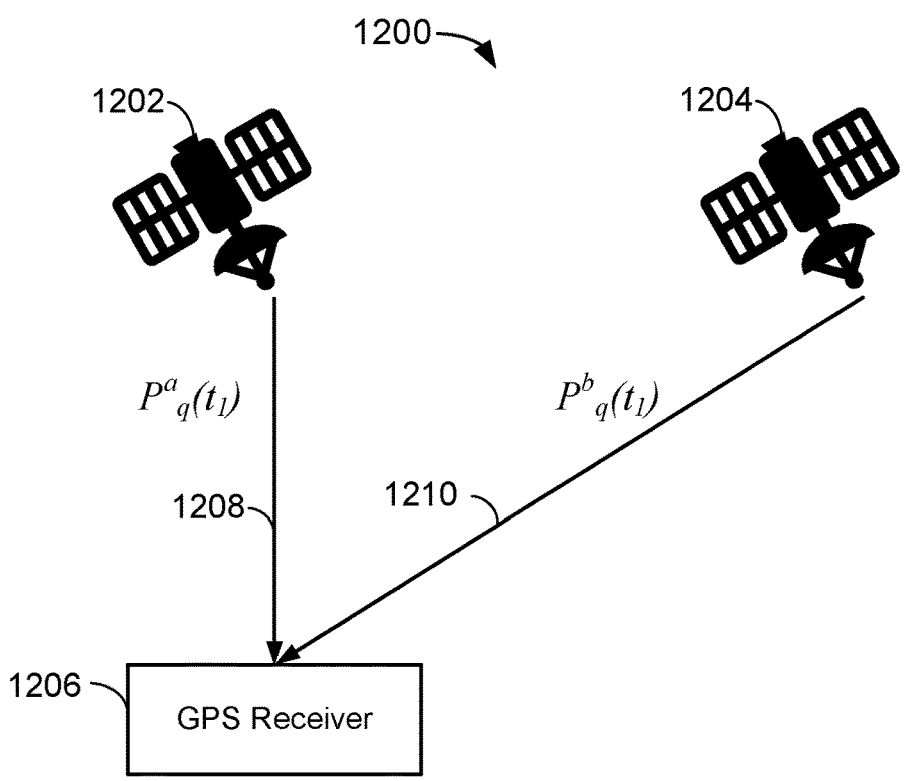
FIG. 12 illustrates a diagram depicting another satellite-based positioning scheme, and in particular a single-difference between transmitters calculation.

FIG. 12 illustrates a diagram 1200 depicting another satellite-based positioning scheme, and in particular a single-difference between transmitters calculation. In FIG. 12, a GPS satellite 1202, a GPS satellite 1204, and a GPS receiver 1206 are depicted. GPS satellite 1202 transmits a GPS signal on a respective path 1208 with phase $P^a_q(t_1)$ to GPS receiver 1206, and GPS satellite 1204 transmits a GPS signal on a respective path 1210 with phase $P^b_q(t_1)$ to GPS receiver 1206, whereby $$\nabla p = \nabla\rho + \nabla d\rho + c\nabla dt + \nabla d_{ion} + \nabla d_{trop} + \varepsilon_{\nabla p}$$

$$\nabla\varphi = \nabla\rho + \nabla d\rho + c\nabla dt - \nabla d_{ion} + \nabla d_{trop} + \varepsilon_{\nabla\varphi} \lambda \nabla N$$

In FIG. 12, a satellite measurement may be subtracted from a base satellite measurement for the same GPS receiver so as to eliminate satellite clock error dT, and to reduce a common hardware bias in the GPS receiver 1206. The is equivalent to RSTD in NR positioning.

Figure 13:
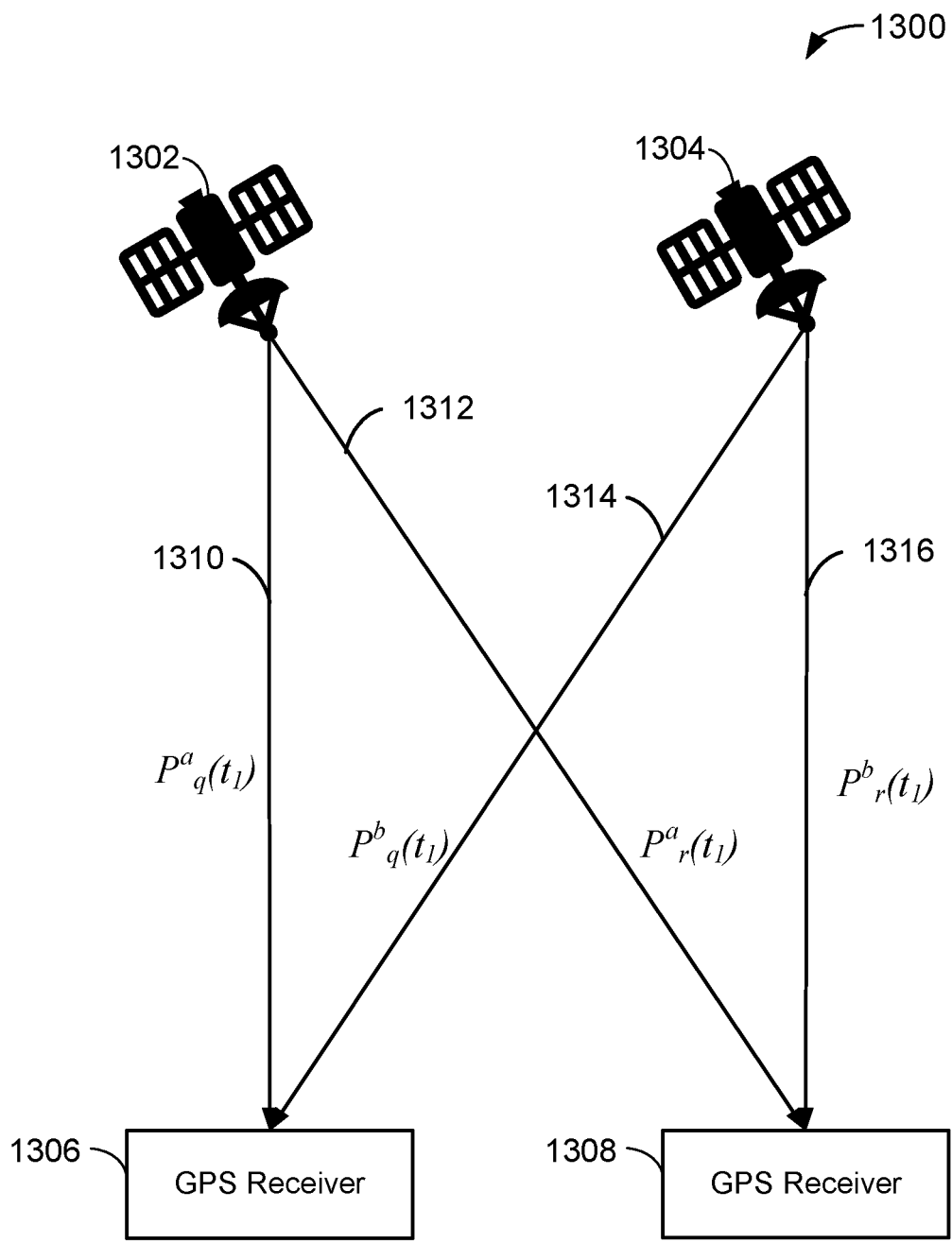
FIG. 13 illustrates a diagram depicting another satellite-based positioning scheme, and in particular a double-difference calculation.

FIG. 13 illustrates a diagram 1300 depicting another satellite-based positioning scheme, and in particular a double-difference calculation. In FIG. 13, a GPS satellite 1302, a GPS satellite 1304, a GPS receiver 1306 and a GPS receiver 1308 are depicted. GPS satellite 1302 transmits a GPS signal on a first path 1310 with phase $P^a_q(t_1)$ to GPS receiver 1306, and on a second path 1312 with phase $P^a_r(t_1)$ to GPS receiver 1308. GPS satellite 1304 transmits a GPS signal on a first path 1314 with phase $P^b_q(t_1)$ to GPS receiver 1306, and on a second path 1316 with phase $P^b_r(t_1)$ to GPS receiver 1308, whereby $$\nabla\Delta p = \nabla\Delta\rho + \nabla\Delta d\rho + \nabla\Delta d_{ion} + \nabla\Delta d_{trop} \varepsilon_{\nabla\Delta p}$$

$$\nabla\Delta\varphi = \nabla\Delta\rho + \nabla\Delta d\rho - \nabla\Delta d_{ion} + \nabla\Delta d_{trop} + \varepsilon_{\nabla\Delta\varphi} + \lambda\nabla\Delta N$$

In FIG. 13, a base station measurement (e.g., GPS receiver 1306) may be subtracted from a rover station measurement (e.g., GPS receiver 1308) for the same satellite, and the difference between these measurements may then be taken from a base satellite (e.g., GPS satellite 1302) and measurements at other satellites (e.g., GPS satellite 1308), which may function to eliminate the satellite clock error dt and receiver clock error dT, and reduce the satellite orbital error dρ, the ionospheric and tropospheric effect, $d_{ion}$ and $d_{trop}$. $\nabla\Delta N$ denotes the double differenced integer ambiguity. For a 20-30 km baseline, the residual error may typically be less than ½ cycle.

Applying a double-difference measurement scheme in NR would provide several technical advantages, including improving positioning accuracy, and reducing resource overhead. However, there are technical challenges in NR that GNSS systems do not face. For example, in GNSS systems, the GNSS signal is broadcasting continuously over time, and both receivers (target UE and reference node) will measure the same GNSS signal, meaning both receivers have one common initial Tx phase $\theta_0$ for a specific satellite, which means that initial Tx phase $\theta_0$ can be eliminated by a double-difference scheme. In contrast, in NR positioning, the PRS is a burst RF signal rather than a continuous signal.

Moreover, current NR specifications do not require a transmitter to maintain coherent phase across two PRS resources transmitted at different times, meaning that the initial phase of a later PRS transmission cannot be predicted with complete accuracy based on the initial phase of an earlier PRS transmission. As a result, if a reference node and a target node measure the same PRS resource in a specific PRS occasion, the reference node and the target node will have the same initial Tx phase $\theta_0$, which can be eliminated by the double-difference scheme. However, if the reference node and the target node measure the same PRS resource but in different PRS occasions, the initial Tx phase $\theta_0$ is not guaranteed to be the same for each PRS transmission and thus cannot be eliminated by the double-difference scheme.

Thus, aspects of the disclosure are directed to a double-differential timing (e.g., RTT or TDOA) scheme in NR, whereby two (or more) differential timing (e.g., RTT or TDOA) measurements are obtained for positioning of a target UE such that the initial Tx phase $\theta_0$ can be guaranteed to be the same for all measurements and thus able to be eliminated by a double-difference scheme. For example, one of the differential timing (e.g., RTT or TDOA) measurements may be used to cancel out (or at least reduce) UE hardware group delay, while another one of the differential timing (e.g., RTT or TDOA) measurements between the UE and wireless nodes (e.g., gNBs, or anchor UEs, or a combination thereof) may be used to cancel out (or at least reduce) residual hardware group delay on the side of the wireless nodes (e.g., gNBs, or anchor UEs, or a combination thereof). Such aspects may provide various technical advantages, such as more accurate UE position estimation. Moreover, as used herein, a "hardware group delay" includes a timing group delay that is at least partially attributable to hardware (e.g., which may vary based on environmental conditions such as temperature, humidity, etc.), but may optionally include other timing delay(s) attributable to factors such as software, firmware, etc.

Figure 14A:
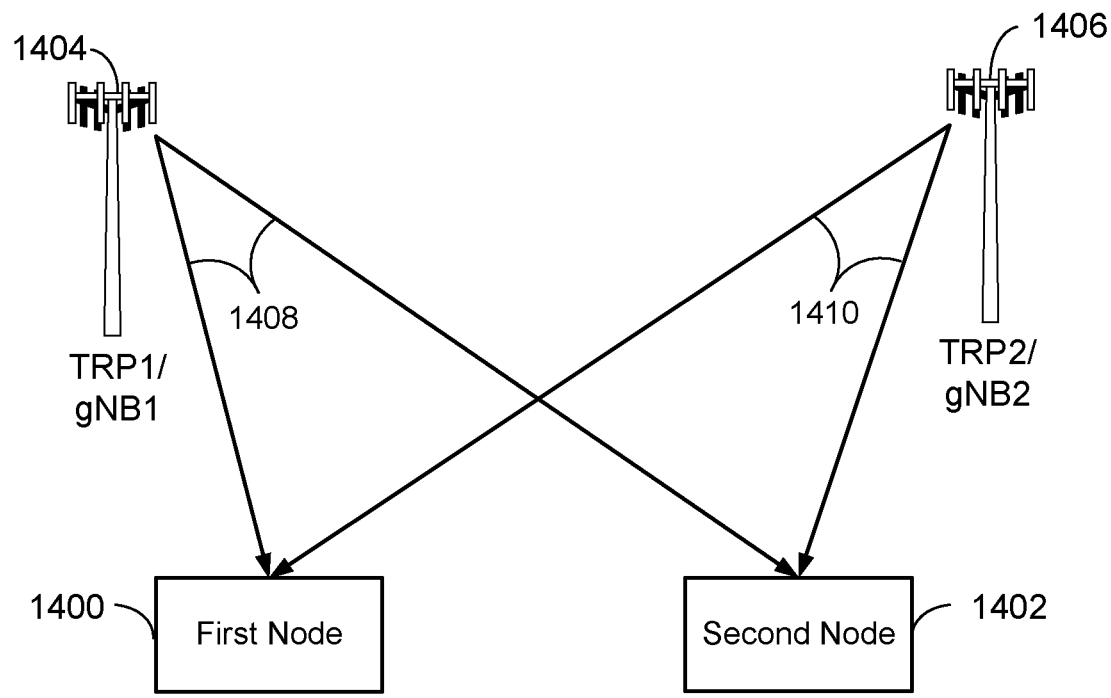
FIGS. 14A and 14B illustrate diagrams depicting carrier phase-based positioning according to aspects of the disclosure.
Figure 14B:
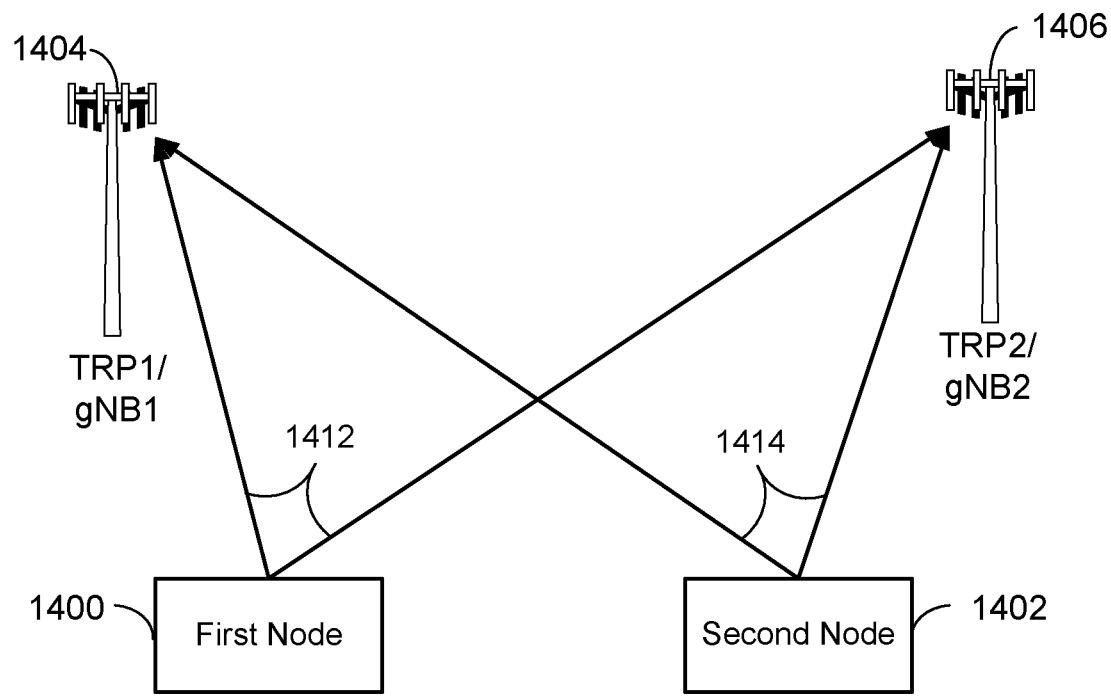

FIG. 14A and FIG. 14B illustrate diagrams depicting carrier phase-based positioning in NR according to aspects of the disclosure. In order to guarantee that the initial Tx phase $\theta_0$ is the same for all measurements involved in a double-difference scheme, aspects of the disclosure are directed to coordination between two nodes, e.g., between a first node 1400 and a second node 1402, for common DL-PRS reception, or between a first TRP/gNB 1404 and a second TRP/gNB 1406 for common UL-PRS (e.g., uplink sounding reference signal (UL-SRS)) reception. In some aspects, the first node 1400 is a UE and the second node 1402 is another UE or a gNB or other base station. Coordination can take multiple forms, including negotiation about measurements using upcoming PRS occasions, negotiation about using measurements taken in previous PRS occasions, and requests by a positioning entity for two nodes to measure a subset of PRS resources in the same PRS occasion. The measurements may be taken using reference signals, such as Uu-PRS (e.g., DL-PRS, UL-SRS, and SRSPos) or SL-PRS.

According to an aspect, the two nodes are instructed to not only measure the same PRS resources to mitigate common timing errors and minimize the impact of clock drift, but also to measure PRS resources in the same PRS occasion, which will guarantee that the measured signals will have the same initial Tx phase $\theta_0$. If the PRS occasion in question has not occurred yet, the two nodes agree to measure that PRS occasion and use those measurements for the double-difference calculation. If the PRS occasion in question has already been occurred and been measured, the two nodes agree to use those particular measurements for the double-difference calculation.

In the example illustrated in FIG. 14A, both the first node 1400 and the second node 1402 measure the same DL-PRS resources in the same PRS occasion, e.g., signal 1408 from TRP1/gNB1 1404. Both the first node 1400 and the second node 1402 also measure the same DL-PRS resources in the same PRS occasion, e.g., signal 1410 from TRP2/gNB2 1406. These sets of measurements can be used in a double-difference calculation, e.g., based on TDoA, because both measurements of signal 1408 will have the same initial Tx phase $\theta_0$ as each other and both measurements of signal 1410 will have the same initial Tx phase $\theta_0$ as each other.

In the example illustrated in FIG. 14B, both the TRP1/gNB1 1404 and the TRP2/gNB2 1406 measure the same UL-PRS resources in the same PRS occasion, e.g., signal 1412 from the first node 1400. Both the TRP1/gNB1 1404 and the TRP2/gNB2 1406 also measure the same UL-PRS resources in the same PRS occasion, e.g., signal 1414 from the second node 1402. These sets of measurements can be used in a double-difference calculation, e.g., based on TDoA, because both measurements of signal 1412 will have the same initial Tx phase $\theta_0$ as each other and both measurements of signal 1414 will have the same initial Tx phase $\theta_0$ as each other.

Figure 15:
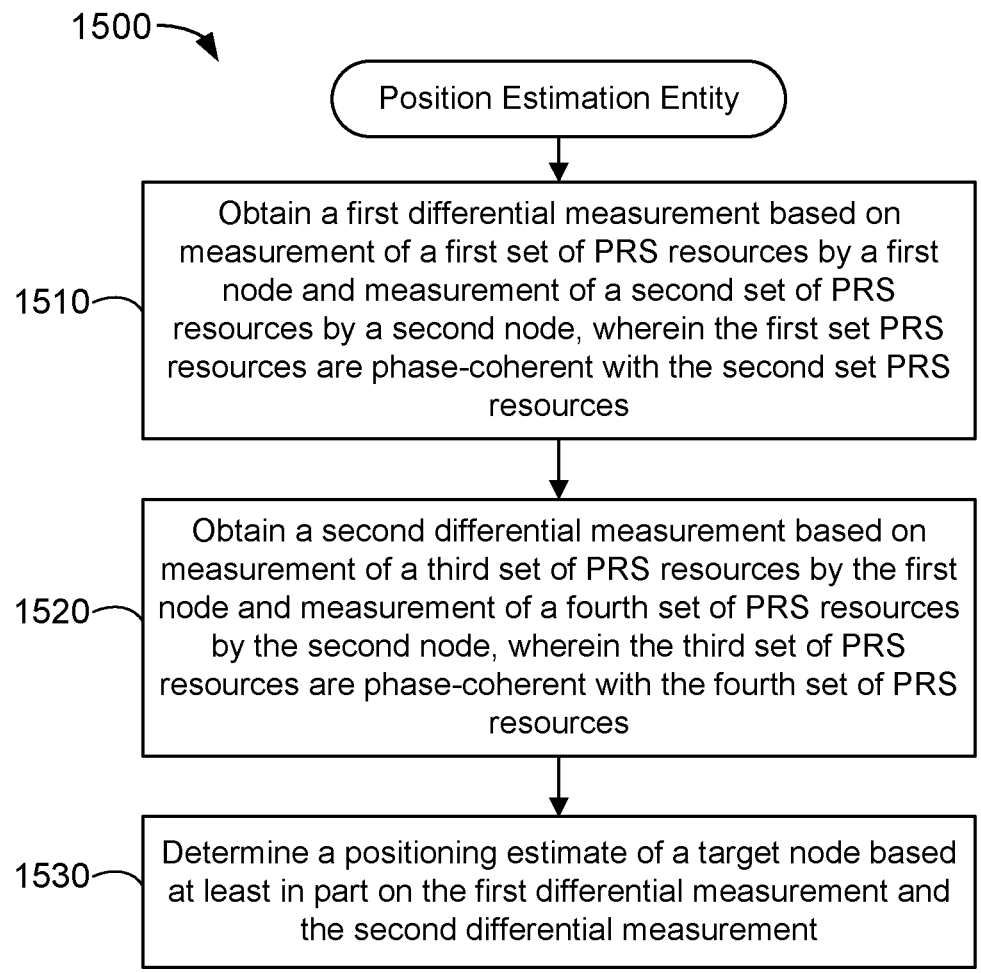
FIG. 15 is a flowchart of an example process for carrier phase-based positioning in NR according to aspects of the present disclosure.

FIG. 15 is a flowchart of an example process 1500 for carrier phase-based positioning. In some implementations, one or more process blocks of FIG. 15 may be performed by a position estimation entity (e.g., a UE 104, a location server 172, etc.). In some implementations, one or more process blocks of FIG. 15 may be performed by another device or group of devices separate from or including the position estimation entity. Additionally, or alternatively, one or more process blocks of FIG. 15 may be performed by one or more components of an apparatus, such as a processor(s), memory, or transceiver(s), any or all of which may be means for performing the operations of process 1500.

As shown in FIG. 15, process 1500 may include obtaining a first differential measurement based on measurement of a first set of PRS resources by a first node and measurement of a second set of PRS resources by a second node, wherein the first set of PRS resources are phase-coherent with the second set of PRS resources (block 1510). In some aspects, the first node comprises a first user equipment or a base station. In some aspects, the second node comprises a second user equipment or a base station. Means for performing the operation of block 1510 may include the processor(s), memory, or transceiver(s) of any of the apparatuses described herein. For example, where the position estimation entity is a UE, such as UE 302, the UE 302 may obtain the first differential measurement using receiver(s) 312; where the position estimation entity is a location server or other network entity, such as network entity 306, the network entity 306 may obtain the second differential measurement via the network transceiver(s) 390.

In some aspects, the first set of PRS resources are within the same PRS occasion as the second set of PRS resources, the first set of PRS resources are within the same PRS resource set as the second set of PRS resources, the first set of PRS resources are the same as the second set of PRS resources, or a combination thereof.

As further shown in FIG. 15, process 1500 may include obtaining a second differential measurement based on measurement of a third set of PRS resources by the first node and measurement of a fourth set of PRS resources by the second node, wherein the third set of PRS resources are phase-coherent with the fourth set of PRS resources (block 1520). Means for performing the operation of block 1520 may include the processor(s), memory, or transceiver(s) of any of the apparatuses described herein. For example, where the position estimation entity is a UE, such as UE 302, the UE 302 may obtain the third differential measurement using receiver(s) 312; where the position estimation entity is a location server or other network entity, such as network entity 306, the network entity 306 may obtain the fourth differential measurement via the network transceiver(s) 390.

In some aspects, process 1500 includes the third set of PRS resources are within the same PRS occasion as the fourth set of PRS resources, the third set of PRS resources are within the same PRS resource set as the fourth set of PRS resources, the third set of PRS resources are the same as the fourth set of PRS resources, or a combination thereof.

As further shown in FIG. 15, process 1500 may include determining a positioning estimate of a target node based at least in part on the first differential measurement and the second differential measurement (block 1530). Means for performing the operation of block 1530 may include the processor(s), memory, or transceiver(s) of any of the apparatuses described herein. For example, the position estimation entity may determine a positioning estimate of the first node using processor(s) 332 or processor(s) 394.

In some aspects, the first node comprises a first UE, the second node comprises a second UE or a base station; and the first through fourth sets of PRS resources comprise DL-PRS resources or SL-PRS resources. In some aspects, the target node comprises the first node.

In some aspects, the first node comprises a first TRP or base station, the second node comprises a second TRP or base station, and the first through fourth sets of PRS resources comprise UL-SRS resources or UL-PRS resources. In some aspects, the target node comprises a UE that is configured to transmit the first set of positioning resources and the second set of positioning resources.

In some aspects, the position estimation entity comprises a location server or a location management function (LMF).

In some aspects, obtaining the first differential measurement comprises determining the first set of PRS resources and the second set of PRS resources, instructing the first node to perform a first PRS measurement using the first set of PRS resources, instructing the second node to perform a second PRS measurement using the second set of PRS resources, and at least one of receiving results of the first PRS measurement from the first node, receiving results of the second PRS measurement from the second node, and calculating the first differential measurement based on the results of the first PRS measurement and the results of the second PRS measurement, or receiving the first differential measurement from the first node or the second node.

In some aspects, obtaining the second differential measurement comprises determining the third set of PRS resources and the fourth set of PRS resources, instructing the first node to perform a third PRS measurement using the third set of PRS resources, instructing the second node to perform a fourth PRS measurement using the fourth set of PRS resources, and at least one of receiving results of the third PRS measurement from the first node, receiving results of the fourth PRS measurement from the second node, and calculating the second differential measurement based on the results of the third PRS measurement and the results of the fourth PRS measurement, or receiving the second differential measurement from the first node or the second node.

In some aspects, the position estimation entity comprises the first node.

In some aspects, obtaining the first differential measurement comprises receiving, from a network node, an instruction indicating the first set of PRS resources to be measured during a first DL-PRS measurement, performing the first DL-PRS measurement using the first set of PRS resources to obtain results of the first DL-PRS measurement, obtaining results of a second DL-PRS measurement from the second node, and calculating the first differential measurement based on the results of the first DL-PRS measurement and the results of the second DL-PRS measurement.

In some aspects, obtaining results of the second DL-PRS measurement from the second node comprises sending, via a sidelink channel or a Uu channel, a request for the results of the second DL-PRS measurement to the second node, to a base station that serves the second node, or to a network entity, and receiving the results of the second DL-PRS measurement from the second node, from the base station that serves the second node, or from the network entity.

In some aspects, obtaining the second differential measurement comprises receiving, from a network node, an instruction indicating the third set of PRS resources to be measured during a third DL-PRS measurement, performing the third DL-PRS measurement using the third set of PRS resources to obtain results of the third DL-PRS measurement, obtaining results of a fourth DL-PRS measurement from the second node, and calculating the second differential measurement based on the results of the third DL-PRS measurement and the results of the fourth DL-PRS measurement.

In some aspects, obtaining results of the fourth DL-PRS measurement from the second node comprises sending, via a sidelink channel or a Uu channel, a request for the results of the fourth DL-PRS measurement to the second node, to a base station that serves the second node, or to a network entity, and receiving the results of the fourth DL-PRS measurement from the second node, from the base station that serves the second node, or from the network entity.

Process 1500 may include additional implementations, such as any single implementation or any combination of implementations described below and/or in connection with one or more other processes described elsewhere herein. Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

Signaling

In an aspect, a measurement request message contains indications of the set of future or previous PRS occasions to be used for positioning measurements. In an aspect, a measurement response message contains indications of the PRS occasions that were used for positioning measurements. In an aspect, the indications may use a hierarchy structure similar to the PRS configuration, e.g., the indications may include a list of TRPs, a list of PRS resource sets, a list of PRS resources, etc. In an aspect, to save overhead, a bit field may be used instead of a list of PRS resource set IDs or PRS resource IDs for the request and response. Since current specifications limit the number of PRS resource sets and the number of PRS resources to sixty-four, a 64-bit bit field may be used. In situations where less than the maximum number of resources are configured, a smaller bit field may be used to save overhead.

In an aspect, the request message or the response message also comprises indications of a set of PRS occasions required for future or previous measurements. In an aspect, a PRS occasion may be identified by one or more indices for PRS occasions, measurement gap (MG) occasions, system frame number (SFN), repetition index, or combinations thereof.

In an aspect, the request or response message may contain additional information relating to occasion constraint relaxation. For example, in current 3GPP specifications, DMRS bundling across consecutive slots imposes the requirement of carrier phase coherence across the consecutive slots, which means that bundled DMRS signals measured in consecutive slots will have the same initial Tx phase $\theta_0$, and thus the constraint that DMRS signals be measured from the same DMRS occasion can be relaxed if DMRS bundling is being used. Likewise, a request or response message may indicate a similar flexibility of measurement, such as defining a maximum occasion, slot, or repetition away from the required occasion in which a PRS measurement may be taken.

In an aspect, the request may be identified and treated as a necessary request or an optional request. In an aspect, the request type may depend on the node type. For example, a request to a gNB may be an optional request.

In an aspect, the request and response messages can be exchanged by RRC, MAC-CE, DCI, UCI, or combinations thereof. For a network-controlled PRS measurement request sent via RRC, each PRS resource may be tagged to indicate whether or not it must be measured.

Regarding sharing of measurement data, in an aspect, a node will send or share its measurements to a positioning entity or other nodes based on negotiations and the specific request. In an aspect, each measurement should be labeled with its PRS resource set ID, PRS resource ID, and PRS occasion ID explicitly.

Negotiation

In an aspect, two or more nodes may need to negotiate the measurement planning between or among themselves. In an aspect, one node is the requester, and the other node is the requestee. In one scenario, a target UE is the requester, and a reference device is the requestee. This arrangement may be preferred because the final goal is to estimate the target UE's location, and the target UE may not have good reception of PRS resources, e.g., due to environment and channel conditions. In this scenario, the target UE can control the measurement planning to suit its own need, e.g., by avoiding measuring PRS resources that the target UE cannot measure accurately. In another scenario, the reference device is the requester, and the target UE is the requestee.

The two or more nodes may exchange messages via number of ways. For example, if the two nodes are both UEs, then they may exchange messages directly via sidelink (SL), or indirectly via the cellular network (e.g., via a base station or the core network), or via a location server (e.g., an LMF may relay or maintain two LPP sessions between the two UEs). If one node is a base station and the other node is a UE, they may exchange messages directly via a Uu link, or indirectly via a location server (e.g., an LMF may maintain two LPP+NRRPa sessions).

Reporting

Different reporting approaches may be used. In an aspect, a second node may share its all of its previous measurements with a target UE, and the target UE corrects its measurements using the intersection of its measurements and the second node's measurements. If the second node is a UE, the second node may share its measurements via a SL channel to the target UE, or using a broadcasting channel to the target UE and other UEs in the vicinity. If the second node is a UE or base station, it may share its measurements via a location server by Uu, by the core network, or by both. If the second node is a base station, the second node may share its measurements via Uu. In another aspect, both the second node and the target UE share all of their previous measurements with an LMF, which finds the intersection between the target UE's measurements and the second node's measurements.

When a second node shares all of its previous measurements with a first node, or when both the second node and the first node share all of their previous measurements with a location server, the broadcasting overhead may be very large. If only a subset of the previous measurements are to be used for a double-difference calculation, it is not necessary to transmit all of the previous measurements. Thus, in an aspect a second node or first node share only those previous measurements that may be used in a double-difference calculation, e.g., using some of the signaling techniques described above to identify which PRS occasions, PRS resource sets, PRS resources, and MGs are allowed to be used for a double-difference calculation.

For example, in UE-based positioning, a UE may request the location server to send to the UE measurements that the location server has already received from a second node. In an aspect, the target UE could use an LPP session to send the request to the location server, the request identifying specific measurements that can be used for a double-difference calculation, and the location server may respond by sending just that subset of second node's measurements (rather than sending all of the second node's measurements), which would reduce signaling overhead and would also reduce processing on the target UE side.

Figure 16A:
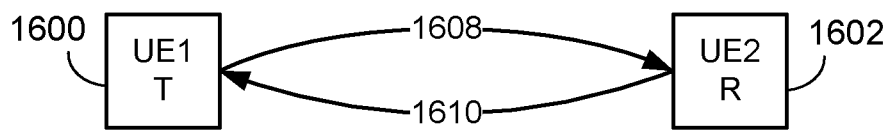
FIG. 16A through FIG. 16E illustrate processes associated with PRS measurements for carrier phase-based positioning in NR according to various aspects of the present disclosure.
Figure 16B:
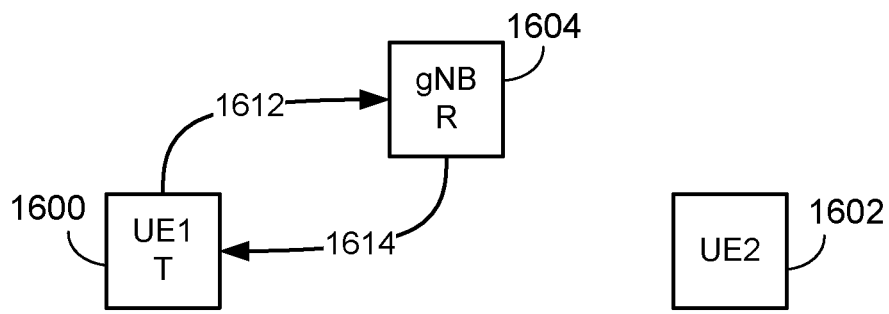
Figure 16C:
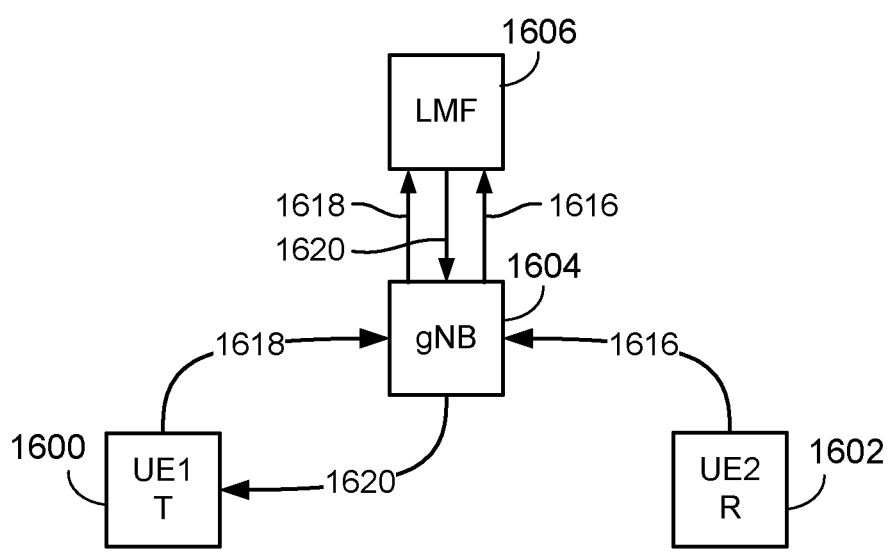
Figure 16D:
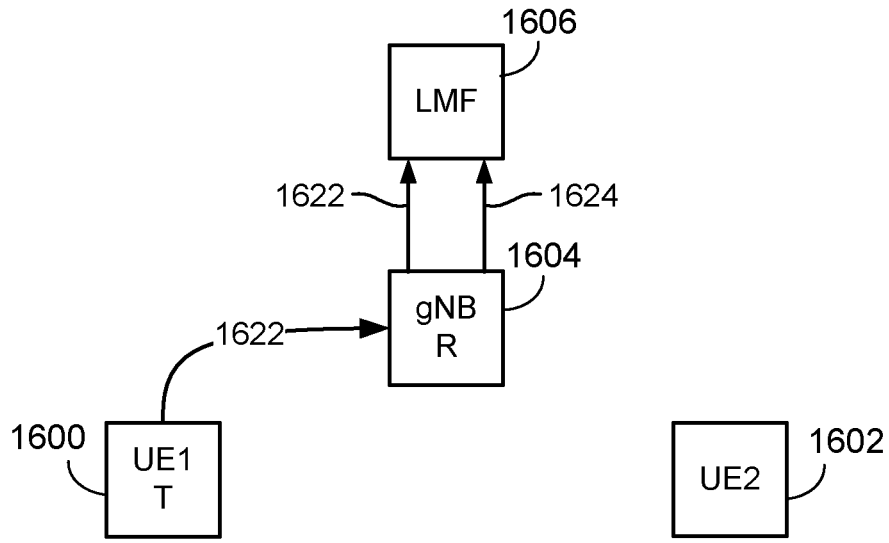
Figure 16E:
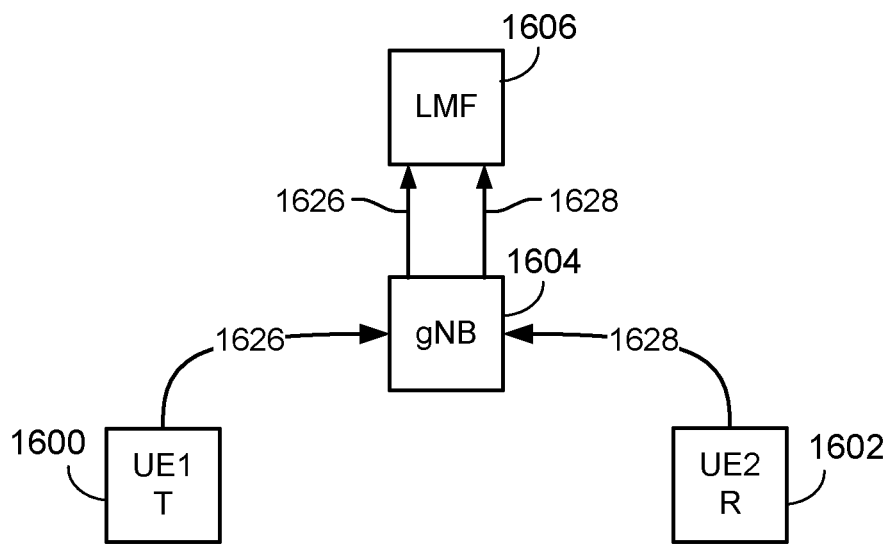

FIG. 16A through FIG. 16E illustrate various aspects of the present disclosure. FIGS. 16A-E illustrate interactions that can occur between a first UE 1600, a second UE 1602, a base station, such as gNB 1604, and a location server, such as LMF 1606. FIGS. 16A-C illustrate UE-based positioning calculations, and FIGS. 16D-E illustrate network-based (UE-assisted) positioning calculations.

In FIG. 16A, the first UE 1600 is the first node, and the second UE 1602 is the second node. The first UE 1600 sends, to the second UE 1602, a request 1608 for measurement information, and the second UE 1602 sends, to the first UE 1600, a response 1610 that includes the requested measurement information. Both the request 1608 and the response 1610 are sidelink communications. The first UE 1600 can then perform a UE-based double-difference calculation that includes carrier phase-based positioning.

In FIG. 16B, the first UE 1600 is the first node, and the gNB 1604 is the second node. The first UE 1600 sends, to the gNB 1604, a request 1612 for measurement information, and the gNB 1604 sends, to the first UE 1600, a response 1614 that includes the requested measurement information. Both the request 1612 and the response 1614 are Uu communications. The first UE 1600 can then perform a UE-based double-difference calculation that includes carrier phase-based positioning. In the example shown in FIG. 16B, UE2 1602 is not involved in the measurement process.

In FIG. 16C, the first UE 1600 is the first node, and the second UE 1602 is the second node. The second UE 1602 sends measurement information 1616 to the LMF 1606, e.g., via the gNB 1604. The first UE 1600 then sends a request 1618 for the second UE's measurement information to LMF 1606, e.g., via the gNB 1604. The LMF 1606 sends a response 1620 that includes the requested information to the first UE 1600 via the gNB 1604. In an aspect, the request 1618 and the response 1620 may be communicated via LPP. The first UE 1600 can then perform a UE-based double-difference calculation that includes carrier phase-based positioning.

In FIG. 16D, the first UE 1600 is the first node, and the gNB 1604 is the second node. The first UE 1600 sends measurement information 1622 to the LMF 1606, e.g., via the gNB 1604. The gNB 1604 sends measurement information 1624 to the LMF 1606. The LMF 1606 can then perform a network-based double-difference calculation that includes carrier phase-based positioning. In the example shown in FIG. 16D, UE2 1602 is not involved in the measurement process.

In FIG. 16E, the first UE 1600 is the target mode, and the second UE 1602 is the second node. The first UE 1600 sends measurement information 1626 to the LMF 1606, e.g., via the gNB 1604. The second UE 1602 sends measurement information 1628 to the LMF 1606, e.g., via the gNB 1604. The LMF 1606 can then perform a network-based (UE-assisted) double-difference calculation that includes carrier phase-based positioning.

In an aspect, the LMF 1606 may, determine the best set or subset of PRS measurements that both the first node and the second node can perform, e.g., based on previous measurement reports, and then send measurement requests to both the first node and the second node, the requests identifying not only the PRS resource set(s) or PRS resource(s) to be used, but also identifying the PRS occasion(s) to be measured. The best set or subset of PRS measurements may comprise the intersection or union of the PRS measurements from the two nodes that meet one or more criteria.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Implementation examples are described in the following numbered clauses:

Clause 1. A method, performed at a position estimation entity, for carrier phase-based positioning, the method comprising: obtaining a first differential measurement based on measurement of a first set of positioning reference signal (PRS) resources by a first node and measurement of a second set of PRS resources by a second node, wherein the first set of PRS resources are phase-coherent with the second set of PRS resources; obtaining a second differential measurement based on measurement of a third set of PRS resources by the first node and measurement of a fourth set of PRS resources by the second node, wherein the third set of PRS resources are phase-coherent with the fourth set of PRS resources; and determining a positioning estimate of the first node based at least in part on the first differential measurement and the second differential measurement.

Clause 2. The method of clause 1, wherein: the first node comprises a first user equipment (UE); the second node comprises a second UE or a base station; and the first set of PRS resources, the second set of PRS resources, the third set of PRS resources, and the fourth set of PRS resources comprise downlink PRS (DL-PRS) resources or sidelink PRS (SL-PRS) resources.

Clause 3. The method of any of clauses 1 to 2, wherein: the first node comprises a first transmission/reception point (TRP) or base station; the second node comprises a second TRP or base station; and the first set of PRS resources, the second set of PRS resources, the third set of PRS resources, and the fourth set of PRS resources comprise uplink sounding reference signal (UL-SRS) resources or uplink PRS (UL-PRS) resources.

Clause 4. The method of any of clauses 1 to 3, wherein: the first set of PRS resources are within the same PRS occasion as the second set of PRS resources; the first set of PRS resources are within the same PRS resource set as the second set of PRS resources; the first set of PRS resources are the same as the second set of PRS resources; or a combination thereof.

Clause 5. The method of any of clauses 1 to 4, wherein: the third set of PRS resources are within the same PRS occasion as the fourth set of PRS resources; the third set of PRS resources are within the same PRS resource set as the fourth set of PRS resources; the third set of PRS resources are the same as the fourth set of PRS resources; or a combination thereof.

Clause 6. The method of any of clauses 1 to 5, wherein the second node comprises a second user equipment or a base station.

Clause 7. The method of any of clauses 1 to 6, wherein the position estimation entity comprises a location server or a location management function (LMF).

Clause 8. The method of clause 7, wherein obtaining the first differential measurement comprises: determining the first set of PRS resources and the second set of PRS resources; instructing the first node to perform a first PRS measurement using the first set of PRS resources; instructing the second node to perform a second PRS measurement using the second set of PRS resources; and at least one of: receiving results of the first PRS measurement from the first node, receiving results of the second PRS measurement from the second node, and calculating the first differential measurement based on the results of the first PRS measurement and the results of the second PRS measurement; or receiving the first differential measurement from the first node or the second node.

Clause 9. The method of any of clauses 7 to 8, wherein obtaining the second differential measurement comprises: determining the third set of PRS resources and the fourth set of PRS resources; instructing the first node to perform a third PRS measurement using the third set of PRS resources; instructing the second node to perform a fourth PRS measurement using the fourth set of PRS resources; and at least one of: receiving results of the third PRS measurement from the first node, receiving results of the fourth PRS measurement from the second node, and calculating the second differential measurement based on the results of the third PRS measurement and the results of the fourth PRS measurement; or receiving the second differential measurement from the first node or the second node.

Clause 10. The method of any of clauses 1 to 9, wherein the position estimation entity comprises the first node.

Clause 11. The method of any of clauses 1 to 10, wherein the first node comprises a first user equipment.

Clause 12. The method of clause 11, wherein obtaining the first differential measurement comprises: receiving, from a network node, an instruction indicating the first set of PRS resources to be measured during a first PRS measurement; performing the first PRS measurement using the first set of PRS resources to obtain results of the first PRS measurement; obtaining results of a second PRS measurement from the second node; and calculating the first differential measurement based on the results of the first PRS measurement and the results of the second PRS measurement.

Clause 13. The method of clause 12, wherein obtaining results of the second PRS measurement from the second node comprises: sending, via a sidelink channel or a Uu channel, a request for the results of the second PRS measurement to the second node, to a base station that serves the second node, or to a network entity; and receiving the results of the second PRS measurement from the second node, from the base station that serves the second node, or from the network entity.

Clause 14. The method of any of clauses 11 to 13, wherein obtaining the second differential measurement comprises: receiving, from a network node, an instruction indicating the third set of PRS resources to be measured during a third PRS measurement; performing the third PRS measurement using the third set of PRS resources to obtain results of the third PRS measurement; obtaining results of a fourth PRS measurement from the second node; and calculating the second differential measurement based on the results of the third PRS measurement and the results of the fourth PRS measurement.

Clause 15. The method of clause 14, wherein obtaining results of the fourth PRS measurement from the second node comprises: sending, via a sidelink channel or a Uu channel, a request for the results of the fourth PRS measurement to the second node, to a base station that serves the second node, or to a network entity; and receiving the results of the fourth PRS measurement from the second node, from the base station that serves the second node, or from the network entity.

Clause 16. A position estimation entity, comprising: a memory; at least one transceiver; and at least one processor communicatively coupled to the memory and the at least one transceiver, the at least one processor configured to: obtain a first differential measurement based on measurement of a first set of positioning reference signal (PRS) resources by a first node and measurement of a second set of PRS resources by a second node, wherein the first set of PRS resources are phase-coherent with the second set of PRS resources; obtain a second differential measurement based on measurement of a third set of PRS resources by the first node and measurement of a fourth set of PRS resources by the second node, wherein the third set of PRS resources are phase-coherent with the fourth set of PRS resources; and determine a positioning estimate of the first node based at least in part on the first differential measurement and the second differential measurement.

Clause 17. The position estimation entity of clause 16, wherein: the first node comprises a first user equipment (UE); the second node comprises a second UE or a base station; and the first set of PRS resources, the second set of PRS resources, the third set of PRS resources, and the fourth set of PRS resources comprise downlink PRS (DL-PRS) resources or sidelink PRS (SL-PRS) resources.

Clause 18. The position estimation entity of any of clauses 16 to 17, wherein: the first node comprises a first transmission/reception point (TRP) or base station; the second node comprises a second TRP or base station; and the first set of PRS resources, the second set of PRS resources, the third set of PRS resources, and the fourth set of PRS resources comprise uplink sounding reference signal (UL-SRS) resources or uplink PRS (UL-PRS) resources.

Clause 19. The position estimation entity of any of clauses 16 to 18, wherein: the first set of PRS resources are within the same PRS occasion as the second set of PRS resources; the first set of PRS resources are within the same PRS resource set as the second set of PRS resources; the first set of PRS resources are the same as the second set of PRS resources; or a combination thereof.

Clause 20. The position estimation entity of any of clauses 16 to 19, wherein: the third set of PRS resources are within the same PRS occasion as the fourth set of PRS resources; the third set of PRS resources are within the same PRS resource set as the fourth set of PRS resources; the third set of PRS resources are the same as the fourth set of PRS resources; or a combination thereof.

Clause 21. The position estimation entity of any of clauses 16 to 20, wherein the second node comprises a second user equipment or a base station.

Clause 22. The position estimation entity of any of clauses 16 to 21, wherein the position estimation entity comprises a location server or a location management function (LMF).

Clause 23. The position estimation entity of clause 22, wherein, to obtain the first differential measurement, the at least one processor is configured to: determine the first set of PRS resources and the second set of PRS resources; instruct the first node to perform a first PRS measurement using the first set of PRS resources; instruct the second node to perform a second PRS measurement using the second set of PRS resources; and at least one of: receive, via the at least one transceiver, results of the first PRS measurement from the first node, receiving results of the second PRS measurement from the second node, and calculating the first differential measurement based on the results of the first PRS measurement and the results of the second PRS measurement; or receive, via the at least one transceiver, the first differential measurement from the first node or the second node.

Clause 24. The position estimation entity of any of clauses 22 to 23, wherein, to obtain the second differential measurement, the at least one processor is configured to: determine the third set of PRS resources and the fourth set of PRS resources; instruct the first node to perform a third PRS measurement using the third set of PRS resources; instruct the second node to perform a fourth PRS measurement using the fourth set of PRS resources; and at least one of: receive, via the at least one transceiver, results of the third PRS measurement from the first node, receiving results of the fourth PRS measurement from the second node, and calculating the second differential measurement based on the results of the third PRS measurement and the results of the fourth PRS measurement; or receive, via the at least one transceiver, the second differential measurement from the first node or the second node.

Clause 25. The position estimation entity of any of clauses 16 to 24, wherein the position estimation entity comprises the first node.

Clause 26. The position estimation entity of any of clauses 16 to 25, wherein the first node comprises a first user equipment.

Clause 27. The position estimation entity of clause 26, wherein, to obtain the first differential measurement, the at least one processor is configured to: receive, via the at least one transceiver, from a network node, an instruction indicating the first set of PRS resources to be measured during a first PRS measurement; perform the first PRS measurement using the first set of PRS resources to obtain results of the first PRS measurement; obtain results of a second PRS measurement from the second node; and calculate the first differential measurement based on the results of the first PRS measurement and the results of the second PRS measurement.

Clause 28. The position estimation entity of clause 27, wherein, to obtain results of the second PRS measurement from the second node, the at least one processor is configured to: send, via the at least one transceiver, via a sidelink channel or a Uu channel, a request for the results of the second PRS measurement to the second node, to a base station that serves the second node, or to a network entity; and receive, via the at least one transceiver, the results of the second PRS measurement from the second node, from the base station that serves the second node, or from the network entity.

Clause 29. The position estimation entity of any of clauses 26 to 28, wherein, to obtain the second differential measurement, the at least one processor is configured to: receive, via the at least one transceiver, from a network node, an instruction indicating the third set of PRS resources to be measured during a third PRS measurement; perform the third PRS measurement using the third set of PRS resources to obtain results of the third PRS measurement; obtain results of a fourth PRS measurement from the second node; and calculate the second differential measurement based on the results of the third PRS measurement and the results of the fourth PRS measurement.

Clause 30. The position estimation entity of clause 29, wherein, to obtain results of the fourth PRS measurement from the second node, the at least one processor is configured to: send, via the at least one transceiver, via a sidelink channel or a Uu channel, a request for the results of the fourth PRS measurement to the second node, to a base station that serves the second node, or to a network entity; and receive, via the at least one transceiver, the results of the fourth PRS measurement from the second node, from the base station that serves the second node, or from the network entity.

Clause 31. An apparatus comprising a memory, a transceiver, and a processor communicatively coupled to the memory and the transceiver, the memory, the transceiver, and the processor configured to perform a method according to any of clauses 1 to 15.

Clause 32. An apparatus comprising means for performing a method according to any of clauses 1 to 15.

Clause 33. A non-transitory computer-readable medium storing computer-executable instructions, the computer-executable comprising at least one instruction for causing a computer or processor to perform a method according to any of clauses 1 to 15.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, performed at a position estimation entity, for carrier phase-based positioning, the method comprising:
    obtaining a first differential measurement based on measurement of a first set of positioning reference signal (PRS) resources by a first node and measurement of a second set of PRS resources by a second node, wherein the first set of PRS resources are phase-coherent with the second set of PRS resources;
    obtaining a second differential measurement based on measurement of a third set of PRS resources by the first node and measurement of a fourth set of PRS resources by the second node, wherein the third set of PRS resources are phase-coherent with the fourth set of PRS resources; and
    determining a positioning estimate of a target node based at least in part on the first differential measurement and the second differential measurement.

2. The method of claim 1, wherein:
    the first node comprises a first user equipment (UE);
    the second node comprises a second UE or a base station; and
    the first set of PRS resources, the second set of PRS resources, the third set of PRS resources, and the fourth set of PRS resources comprise downlink PRS (DL-PRS) resources or sidelink PRS (SL-PRS) resources.

3. The method of claim 2, wherein the target node comprises the first node.

4. The method of claim 1, wherein:
    the first node comprises a first transmission/reception point (TRP) or base station;
    the second node comprises a second TRP or base station; and
    the first set of PRS resources, the second set of PRS resources, the third set of PRS resources, and the fourth set of PRS resources comprise uplink sounding reference signal (UL-SRS) resources or uplink PRS (UL-PRS) resources.

5. The method of claim 4, wherein the target node comprises a user equipment (UE) that is configured to transmit the first set of positioning resources and the second set of positioning resources.

6. The method of claim 1, wherein:
    the first set of PRS resources are within the same PRS occasion as the second set of PRS resources;
    the first set of PRS resources are within the same PRS resource set as the second set of PRS resources;
    the first set of PRS resources are the same as the second set of PRS resources;
    or a combination thereof.

7. The method of claim 1, wherein:
the third set of PRS resources are within the same PRS occasion as the fourth set of PRS resources;
the third set of PRS resources are within the same PRS resource set as the fourth set of PRS resources;
the third set of PRS resources are the same as the fourth set of PRS resources;
or a combination thereof.

8. The method of claim 1, wherein the position estimation entity comprises a location server or a location management function (LMF).

9. The method of claim 8, wherein obtaining the first differential measurement comprises:
determining the first set of PRS resources and the second set of PRS resources;
instructing the first node to perform a first PRS measurement using the first set of PRS resources;
instructing the second node to perform a second PRS measurement using the second set of PRS resources; and
at least one of:
receiving results of the first PRS measurement from the first node, receiving results of the second PRS measurement from the second node, and calculating the first differential measurement based on the results of the first PRS measurement and the results of the second PRS measurement; or
receiving the first differential measurement from the first node or the second node.

10. The method of claim 8, wherein obtaining the second differential measurement comprises:
determining the third set of PRS resources and the fourth set of PRS resources;
instructing the first node to perform a third PRS measurement using the third set of PRS resources;
instructing the second node to perform a fourth PRS measurement using the fourth set of PRS resources; and
at least one of:
receiving results of the third PRS measurement from the first node, receiving results of the fourth PRS measurement from the second node, and calculating the second differential measurement based on the results of the third PRS measurement and the results of the fourth PRS measurement; or
receiving the second differential measurement from the first node or the second node.

11. The method of claim 2, wherein the position estimation entity comprises the first node.

12. The method of claim 11, wherein obtaining the first differential measurement comprises:
receiving, from a network node, an instruction indicating the first set of PRS resources to be measured during a first PRS measurement;
performing the first PRS measurement using the first set of PRS resources to obtain results of the first PRS measurement;
obtaining results of a second PRS measurement from the second node; and
calculating the first differential measurement based on the results of the first PRS measurement and the results of the second PRS measurement.

13. The method of claim 12, wherein obtaining results of the second PRS measurement from the second node comprises:
sending, via a sidelink channel or a Uu channel, a request for the results of the second PRS measurement to the second node, to a base station that serves the second node, or to a network entity; and
receiving the results of the second PRS measurement from the second node, from the base station that serves the second node, or from the network entity.

14. The method of claim 11, wherein obtaining the second differential measurement comprises:
receiving, from a network node, an instruction indicating the third set of PRS resources to be measured during a third PRS measurement;
performing the third PRS measurement using the third set of PRS resources to obtain results of the third PRS measurement;
obtaining results of a fourth PRS measurement from the second node; and
calculating the second differential measurement based on the results of the third PRS measurement and the results of the fourth PRS measurement.

15. The method of claim 14, wherein obtaining results of the fourth PRS measurement from the second node comprises:
sending, via a sidelink channel or a Uu channel, a request for the results of the fourth PRS measurement to the second node, to a base station that serves the second node, or to a network entity; and
receiving the results of the fourth PRS measurement from the second node, from the base station that serves the second node, or from the network entity.

16. A position estimation entity, comprising:
a memory;
at least one transceiver; and
at least one processor communicatively coupled to the memory and the at least one transceiver, the at least one processor configured to:
obtain a first differential measurement based on measurement of a first set of positioning reference signal (PRS) resources by a first node and measurement of a second set of PRS resources by a second node, wherein the first set of PRS resources are phase-coherent with the second set of PRS resources;
obtain a second differential measurement based on measurement of a third set of PRS resources by the first node and measurement of a fourth set of PRS resources by the second node, wherein the third set of PRS resources are phase-coherent with the fourth set of PRS resources; and
determine a positioning estimate of a target node based at least in part on the first differential measurement and the second differential measurement.

17. The position estimation entity of claim 16, wherein:
the first node comprises a first user equipment (UE);
the second node comprises a second UE or a base station; and
the first set of PRS resources, the second set of PRS resources, the third set of PRS resources, and the fourth set of PRS resources comprise downlink PRS (DL-PRS) resources or sidelink PRS (SL-PRS) resources.

18. The position estimation entity of claim 17, wherein the target node comprises the first node.

19. The position estimation entity of claim 16, wherein:
the first node comprises a first transmission/reception point (TRP) or base station;
the second node comprises a second TRP or base station; and
the first set of PRS resources, the second set of PRS resources, the third set of PRS resources, and the fourth set of PRS resources comprise uplink sounding reference signal (UL-SRS) resources or uplink PRS (UL-PRS) resources.

20. The position estimation entity of claim 19, wherein the target node comprises a user equipment (UE) that is configured to transmit the first set of positioning resources and the second set of positioning resources.

21. The position estimation entity of claim 16, wherein:
the first set of PRS resources are within the same PRS occasion as the second set of PRS resources;
the first set of PRS resources are within the same PRS resource set as the second set of PRS resources;
the first set of PRS resources are the same as the second set of PRS resources;
or a combination thereof.

22. The position estimation entity of claim 16, wherein:
the third set of PRS resources are within the same PRS occasion as the fourth set of PRS resources;
the third set of PRS resources are within the same PRS resource set as the fourth set of PRS resources;
the third set of PRS resources are the same as the fourth set of PRS resources;
or a combination thereof.

23. The position estimation entity of claim 16, wherein the position estimation entity comprises a location server or a location management function (LMF).

24. The position estimation entity of claim 23, wherein, to obtain the first differential measurement, the at least one processor is configured to:
determine the first set of PRS resources and the second set of PRS resources;
instruct the first node to perform a first PRS measurement using the first set of PRS resources;
instruct the second node to perform a second PRS measurement using the second set of PRS resources; and
at least one of:
receive, via the at least one transceiver, results of the first PRS measurement from the first node, receive results of the second PRS measurement from the second node, and calculate the first differential measurement based on the results of the first PRS measurement and the results of the second PRS measurement; or
receive, via the at least one transceiver, the first differential measurement from the first node or the second node.

25. The position estimation entity of claim 23, wherein, to obtain the second differential measurement, the at least one processor is configured to:
determine the third set of PRS resources and the fourth set of PRS resources;
instruct the first node to perform a third PRS measurement using the third set of PRS resources;
instruct the second node to perform a fourth PRS measurement using the fourth set of PRS resources; and
at least one of:
receive, via the at least one transceiver, results of the third PRS measurement from the first node, receive results of the fourth PRS measurement from the second node, and calculate the second differential measurement based on the results of the third PRS measurement and the results of the fourth PRS measurement; or receive, via the at least one transceiver, the second differential measurement from the first node or the second node.

26. The position estimation entity of claim 17, wherein the position estimation entity comprises the first node.

27. The position estimation entity of claim 26, wherein, to obtain the first differential measurement, the at least one processor is configured to:
receive, via the at least one transceiver, from a network node, an instruction indicating the first set of PRS resources to be measured during a first PRS measurement;
perform the first PRS measurement using the first set of PRS resources to obtain results of the first PRS measurement;
obtain results of a second PRS measurement from the second node; and
calculate the first differential measurement based on the results of the first PRS measurement and the results of the second PRS measurement.

28. The position estimation entity of claim 27, wherein, to obtain results of the second PRS measurement from the second node, the at least one processor is configured to:
send, via the at least one transceiver, via a sidelink channel or a Uu channel, a request for the results of the second PRS measurement to the second node, to a base station that serves the second node, or to a network entity; and
receive, via the at least one transceiver, the results of the second PRS measurement from the second node, from the base station that serves the second node, or from the network entity.

29. The position estimation entity of claim 26, wherein, to obtain the second differential measurement, the at least one processor is configured to:
receive, via the at least one transceiver, from a network node, an instruction indicating the third set of PRS resources to be measured during a third PRS measurement;
perform the third PRS measurement using the third set of PRS resources to obtain results of the third PRS measurement;
obtain results of a fourth PRS measurement from the second node; and
calculate the second differential measurement based on the results of the third PRS measurement and the results of the fourth PRS measurement.

30. The position estimation entity of claim 29, wherein, to obtain results of the fourth PRS measurement from the second node, the at least one processor is configured to:
send, via the at least one transceiver, via a sidelink channel or a Uu channel, a request for the results of the fourth PRS measurement to the second node, to a base station that serves the second node, or to a network entity; and
receive, via the at least one transceiver, the results of the fourth PRS measurement from the second node, from the base station that serves the second node, or from the network entity.

* * * * *